(12) United States Patent
Goelet et al.

(10) Patent No.: US 9,802,690 B2
(45) Date of Patent: Oct. 31, 2017

(54) CARGO AIRSHIP

(71) Applicant: LTA Corporation, New York, NY (US)

(72) Inventors: John Goelet, Washington, DC (US); Loginn Kapitan, Vienna, VA (US); Ron Hochstetler, Arlington, VA (US)

(*) Notice: Subject to any disclaimer, the term of this patent is extended or adjusted under 35 U.S.C. 154(b) by 263 days.

(21) Appl. No.: 14/531,481

(22) Filed: Nov. 3, 2014

(65) Prior Publication Data

US 2015/0291269 A1   Oct. 15, 2015

Related U.S. Application Data

(60) Provisional application No. 61/899,574, filed on Nov. 4, 2013, provisional application No. 61/988,584, filed
(Continued)

(51) Int. Cl.
*B64B 1/08* (2006.01)
*B64B 1/22* (2006.01)
*B64D 1/22* (2006.01)
*B64D 9/00* (2006.01)
*B64B 1/10* (2006.01)
*B64B 1/20* (2006.01)
*B64B 1/32* (2006.01)
*B64B 1/34* (2006.01)
(Continued)

(52) U.S. Cl.
CPC ............... *B64B 1/08* (2013.01); *B64B 1/10* (2013.01); *B64B 1/20* (2013.01); *B64B 1/22* (2013.01); *B64B 1/32* (2013.01); *B64B 1/34* (2013.01); *B64B 1/58* (2013.01); *B64B 1/70* (2013.01); *B64D 1/02* (2013.01); *B64D 1/22* (2013.01); *B64D 9/003* (2013.01); *Y02T 50/46* (2013.01)

(58) Field of Classification Search
CPC .................................... B64B 1/22; B64D 1/22
See application file for complete search history.

(56) References Cited

U.S. PATENT DOCUMENTS 1,027,590 A   5/1912   Bucher
1,261,005 A   4/1918   Barstow et al.
(Continued)

FOREIGN PATENT DOCUMENTS

CA   1054124 A1   5/1979
DE   210003      5/1909
(Continued)

OTHER PUBLICATIONS

English translation of German patent DE 42 18 239 C2.*
(Continued)

*Primary Examiner* — Brian M O'Hara
*Assistant Examiner* — Michael Kreiner
(74) *Attorney, Agent, or Firm* — Finnegan, Henderson, Farabow, Garrett & Dunner LLP

(57) ABSTRACT

A cargo airship is disclosed. The cargo airship may include a hull configured to contain a gas and at least one propulsion assembly coupled to the airship and including a propulsion device. The cargo airship may further include a payload bay comprising an external cargo area located outside of the hull. The cargo airship may also include a cargo handling system including at least one hoisting mechanism configured to lift cargo into the external cargo area while the airship is hovering.

13 Claims, 20 Drawing Sheets

Related U.S. Application Data on May 5, 2014, provisional application No. 62/055,978, filed on Sep. 26, 2014.

(51) Int. Cl.
*B64B 1/58* (2006.01)
*B64B 1/70* (2006.01)
*B64D 1/02* (2006.01)

(56) References Cited

U.S. PATENT DOCUMENTS

| | | |
|---|---|---|
| 1,350,211 A | 8/1920 | Corson, Jr. |
| 1,944,467 A | 1/1934 | Sabin |
| 2,286,014 A | 6/1942 | Rowe |
| 2,379,355 A | 6/1945 | Hodgdon |
| 2,935,275 A | 5/1960 | Grayson |
| 3,337,845 A | 8/1967 | Hart |
| 3,395,877 A | 8/1968 | McFadden et al. |
| 3,432,120 A | 3/1969 | Guerrero |
| D213,731 S | 4/1969 | Hsi |
| 3,477,168 A | 11/1969 | Trodglen, Jr. |
| 3,529,283 A | 9/1970 | Emerson |
| 3,580,636 A | 5/1971 | Setto |
| RE28,454 E | 6/1975 | Fitzpatrick et al. |
| 3,946,364 A | 3/1976 | Codomo et al. |
| 3,970,270 A | 7/1976 | Pittet, Jr. |
| 3,971,533 A | 7/1976 | Slater |
| 3,976,265 A | 8/1976 | Doolittle |
| 4,085,912 A | 4/1978 | Slater |
| 4,269,375 A | 5/1981 | Hickey |
| 4,298,175 A | 11/1981 | Earl |
| 4,326,681 A | 4/1982 | Eshoo |
| 4,461,436 A | 7/1984 | Messina |
| D274,999 S | 8/1984 | Reeves |
| D280,194 S | 8/1985 | Bothe |
| 4,583,094 A | 4/1986 | Mosier |
| 4,685,640 A | 8/1987 | Warrington et al. |
| D305,418 S | 1/1990 | Blake |
| 4,901,948 A | 2/1990 | Panos |
| D307,131 S | 4/1990 | Kramer |
| 4,914,976 A | 4/1990 | Wyllie |
| 4,915,792 A | 4/1990 | Zeilon |
| D307,884 S | 5/1990 | Ninkovich |
| D309,887 S | 8/1990 | Ninkovich |
| 5,026,003 A | 6/1991 | Smith |
| 5,096,141 A | 3/1992 | Schley |
| 5,170,963 A | 12/1992 | Beck, Jr. |
| 5,240,206 A | 8/1993 | Omiya |
| 5,281,960 A | 1/1994 | Dwyer, III |
| 5,348,251 A | 9/1994 | Ferguson |
| 5,351,911 A | 10/1994 | Neumayr |
| 5,368,256 A | 11/1994 | Kalisz et al. |
| 5,516,060 A | 5/1996 | McDonnell |
| 5,614,897 A | 3/1997 | Durnford |
| 5,675,327 A | 10/1997 | Coirier et al. |
| 5,755,402 A | 5/1998 | Henry |
| 5,823,468 A | 10/1998 | Bothe |
| 5,906,335 A | 5/1999 | Thompson |
| D418,804 S | 1/2000 | Glasgow et al. |
| 6,010,093 A | 1/2000 | Paulson |
| 6,019,312 A | 2/2000 | Blenn |
| D424,508 S | 5/2000 | Hankinson et al. |
| 6,156,102 A | 12/2000 | Conrad et al. |
| 6,164,589 A | 12/2000 | Kalisz |
| 6,196,498 B1 | 3/2001 | Eichstedt et al. |
| 6,230,503 B1 | 5/2001 | Spletzer |
| 6,231,007 B1 | 5/2001 | Schäfer |
| 6,286,783 B1 | 9/2001 | Keunkler |
| 6,293,493 B1 | 9/2001 | Eichstedt et al. |
| 6,302,357 B1 | 10/2001 | Kalisz |
| 6,302,944 B1 | 10/2001 | Hoenig |
| 6,311,925 B1 | 11/2001 | Rist |
| 6,315,242 B1 | 11/2001 | Eichstedt et al. |
| 6,328,257 B1 | 12/2001 | Schäfer |
| 6,336,957 B1 | 1/2002 | Tsymerman |
| 6,360,549 B1 | 3/2002 | Spletzer et al. |
| 6,383,727 B1 | 5/2002 | Twist et al. |
| 6,393,719 B1 | 5/2002 | Stipp |
| 6,427,943 B2 | 8/2002 | Yokomaku et al. |
| 6,453,684 B1 | 9/2002 | Spletzer et al. |
| 6,499,309 B1 | 12/2002 | Yeh |
| 6,511,525 B2 | 1/2003 | Spletzer et al. |
| 6,549,179 B2 | 4/2003 | Youngquist et al. |
| 6,565,037 B1 | 5/2003 | Tonkovich |
| 6,574,979 B2 | 6/2003 | Faqih |
| 6,577,929 B2 | 6/2003 | Johnson et al. |
| 6,644,060 B1 | 11/2003 | Dagon |
| 6,648,272 B1 | 11/2003 | Kothmann |
| 6,659,838 B1 | 12/2003 | Anderson |
| 6,670,304 B2 | 12/2003 | Chang |
| 6,702,229 B2 | 3/2004 | Anderson et al. |
| 6,868,690 B2 | 3/2005 | Faqih |
| 6,880,783 B2 | 4/2005 | Munk |
| 6,885,313 B2 | 4/2005 | Selk et al. |
| 6,892,118 B1 | 5/2005 | Feyereisen |
| 6,910,339 B2 | 6/2005 | Laine et al. |
| 6,955,715 B1 | 10/2005 | Tittle |
| 6,960,243 B1 | 11/2005 | Smith et al. |
| 6,966,523 B2 | 11/2005 | Colting |
| 7,000,410 B2 | 2/2006 | Hutchinson |
| 7,040,572 B2 | 5/2006 | Munk |
| 7,043,934 B2 | 5/2006 | Radermacher et al. |
| 7,055,777 B2 | 6/2006 | Colting |
| 7,108,228 B1 | 9/2006 | Marshall |
| 7,137,592 B2 | 11/2006 | Barocela et al. |
| 7,156,342 B2 | 1/2007 | Heaven, Jr. et al. |
| 7,159,817 B2 | 1/2007 | VanderMey et al. |
| 7,216,069 B2 | 5/2007 | Hett |
| 7,251,945 B2 | 8/2007 | Tongue |
| 7,306,654 B2 | 12/2007 | King et al. |
| 7,384,454 B2 | 6/2008 | Tongue |
| D577,100 S | 9/2008 | Brown et al. |
| D583,294 S | 12/2008 | Balaskovic |
| 7,478,535 B2 | 1/2009 | Turner, Jr. |
| 7,601,208 B2 | 10/2009 | Tongue |
| 7,722,706 B2 | 5/2010 | Thielow |
| 7,759,275 B2 | 7/2010 | Birbara et al. |
| 7,760,438 B1 | 7/2010 | Suiter |
| 7,825,830 B2 | 11/2010 | Joyner |
| 7,866,601 B2 | 1/2011 | Balaskovic |
| 8,152,092 B2 | 4/2012 | Zulkowski et al. |
| 9,139,283 B1 * | 9/2015 | Campbell ............... B64C 1/22 |
| 2002/0003189 A1 | 1/2002 | Kuenkler |
| 2002/0109045 A1 | 8/2002 | Beach et al. |
| 2003/0001044 A1 | 1/2003 | Munk |
| 2003/0023355 A1 | 1/2003 | Johnson et al. |
| 2003/0127557 A1 | 7/2003 | Anderson et al. |
| 2003/0234320 A1 | 12/2003 | Colting |
| 2004/0162000 A1 | 8/2004 | Anderson |
| 2005/0277359 A1 | 12/2005 | Anderson |
| 2006/0000945 A1 | 1/2006 | Voss |
| 2006/0016930 A1 | 1/2006 | Pak |
| 2006/0060695 A1 | 3/2006 | Walden et al. |
| 2006/0065777 A1 | 3/2006 | Walden et al. |
| 2006/0151666 A1 | 7/2006 | VanderMey et al. |
| 2006/0227013 A1 | 10/2006 | Harvison et al. |
| 2006/0261213 A1 | 11/2006 | Lavan |
| 2006/0284002 A1 | 12/2006 | Stephens et al. |
| 2007/0295859 A1 | 12/2007 | Colvin |
| 2008/0035787 A1 | 2/2008 | Thompson |
| 2008/0179454 A1 | 7/2008 | Balaskovic |
| 2009/0109064 A1 | 4/2009 | Joyner |
| 2009/0200416 A1 | 8/2009 | Lee |
| 2009/0272841 A1 | 11/2009 | Sinsabaugh et al. |
| 2009/0321557 A1 | 12/2009 | Colting |
| 2010/0067118 A1 | 3/2010 | Takahashi et al. |
| 2010/0076628 A1 | 3/2010 | Boorman et al. |
| 2010/0102164 A1 | 4/2010 | Brutoco |
| 2010/0140391 A1 | 6/2010 | Wu |

(56) References Cited

U.S. PATENT DOCUMENTS

| | | |
|---|---|---|
| 2011/0051041 A1 | 3/2011 | Yashiro |
| 2011/0163200 A1 | 7/2011 | Balaskovic |
| 2012/0018571 A1 | 1/2012 | Goelet |
| 2012/0212228 A1 | 8/2012 | Cho et al. |

FOREIGN PATENT DOCUMENTS

| | | |
|---|---|---|
| DE | 2348085 A1 | 4/1975 |
| DE | 2640433 C2 | 4/1977 |
| DE | 3508101 A1 | 9/1986 |
| DE | 4218239 A1 | 12/1993 |
| DE | 197 44 581 A1 | 4/1999 |
| DE | 19811794 A1 | 9/1999 |
| DE | 19924464 A1 | 11/2000 |
| DE | 10011319 A1 | 9/2001 |
| DE | 201 15 193 U1 | 1/2002 |
| DE | 20116152 U1 | 2/2002 |
| DE | 10058072 A1 | 6/2002 |
| DE | 20204023 U1 | 7/2002 |
| DE | 10120232 A1 | 10/2002 |
| DE | 10121854 C1 | 11/2002 |
| DE | 10139877 A1 | 2/2003 |
| DE | 10148589 A1 | 4/2003 |
| DE | 10148590 A1 | 4/2003 |
| DE | 10201133 A1 | 7/2003 |
| DE | 10210541 A1 | 9/2003 |
| DE | 10210542 A1 | 9/2003 |
| DE | 10216480 A1 | 10/2003 |
| DE | 10226868 A1 | 12/2003 |
| DE | 10228048 A1 | 1/2004 |
| DE | 10252895 A1 | 5/2004 |
| DE | 10252896 A1 | 5/2004 |
| DE | 10252908 A1 | 5/2004 |
| DE | 10252909 A1 | 5/2004 |
| DE | 10252910 A1 | 5/2004 |
| DE | 10252911 A1 | 5/2004 |
| DE | 10 2005 01352 | 6/2007 |
| EP | 0095763 A2 | 12/1983 |
| EP | 0 282 425 A1 | 9/1988 |
| EP | 0 291 355 A2 | 11/1988 |
| EP | 0 325 452 A1 | 7/1989 |
| EP | 0 503 801 A2 | 9/1992 |
| EP | 0 619 792 B1 | 10/1994 |
| EP | 0 714 362 B1 | 6/1996 |
| EP | 0 729 423 B1 | 9/1996 |
| EP | 0 745 045 B1 | 12/1996 |
| EP | 1 070 008 B1 | 1/2001 |
| EP | 1 160 156 A2 | 12/2001 |
| EP | 1 292 474 B1 | 3/2003 |
| EP | 1 294 608 B1 | 3/2003 |
| EP | 1 451 063 B1 | 9/2004 |
| EP | 1 529 726 A2 | 5/2005 |
| EP | 1 770 009 A2 | 4/2007 |
| FR | 2630397 A1 | 10/1989 |
| FR | 2 813 663 A1 | 3/2002 |
| FR | 2 815 336 A1 | 4/2002 |
| FR | 2830838 B1 | 4/2003 |
| FR | 2 853 895 A1 | 10/2004 |
| FR | 2 896 495 A1 | 7/2007 |
| GB | 1 577 488 | 10/1980 |
| GB | 2 055 728 A | 3/1981 |
| GB | 2 197 276 A | 5/1988 |
| GB | 2 250 007 A | 5/1992 |
| GB | 2 275 036 A | 8/1994 |
| GB | 2 278 815 A | 12/1994 |
| GB | 2 300 010 A | 10/1996 |
| GB | 2359534 A | 8/2001 |
| GB | 2 366 274 A | 3/2002 |
| GB | 2 447 411 A | 9/2008 |
| JP | 52145999 | 12/1977 |
| RU | 37568 | 10/1993 |
| RU | 2009073 C1 | 3/1994 |
| RU | 40822 S | 1/1995 |
| RU | 2028249 C1 | 2/1995 |
| RU | 2070136 C1 | 12/1996 |
| RU | 2092381 C1 | 10/1997 |
| RU | 2098318 C1 | 12/1997 |
| RU | 2111146 D1 | 5/1998 |
| RU | 2111147 C1 | 5/1998 |
| RU | 2114027 C1 | 6/1998 |
| RU | 2141911 C1 | 11/1999 |
| RU | 2196703 C2 | 1/2003 |
| RU | 2249536 C1 | 4/2005 |
| RU | 2250122 C1 | 4/2005 |
| SU | 1799335 A3 | 2/1993 |
| UA | 10870 A | 12/1996 |
| UA | 32397 A | 12/2000 |
| UA | 55928 A | 4/2003 |
| WO | WO 92/06002 A1 | 4/1992 |
| WO | WO 93/13979 A1 | 7/1993 |
| WO | WO 93/24364 A2 | 12/1993 |
| WO | WO 95/05307 A1 | 2/1995 |
| WO | WO 95/14607 A1 | 6/1995 |
| WO | WO 95/22486 A1 | 8/1995 |
| WO | WO 95/27652 A1 | 10/1995 |
| WO | WO 95/32893 A1 | 12/1995 |
| WO | WO 95/32894 A1 | 12/1995 |
| WO | WO 96/20897 | 7/1996 |
| WO | WO 96/38340 A1 | 12/1996 |
| WO | WO 97/15492 A2 | 5/1997 |
| WO | WO 97/49606 A1 | 12/1997 |
| WO | WO 98/28188 A1 | 7/1998 |
| WO | WO 98/29303 A2 | 7/1998 |
| WO | WO 98/31589 A1 | 7/1998 |
| WO | WO 98/58217 | 12/1998 |
| WO | WO 99/67131 A1 | 12/1999 |
| WO | WO 00/48902 A1 | 8/2000 |
| WO | WO 00/73142 A2 | 12/2000 |
| WO | WO 01/36885 | 5/2001 |
| WO | WO 01/42082 A1 | 6/2001 |
| WO | WO 01/68447 A2 | 9/2001 |
| WO | WO 01/94172 A1 | 12/2001 |
| WO | WO 03/021291 | 3/2003 |
| WO | WO 03/024791 A1 | 3/2003 |
| WO | WO 03/047967 A1 | 6/2003 |
| WO | WO 03/055745 A1 | 7/2003 |
| WO | WO 03/055746 A1 | 7/2003 |
| WO | WO 03/074356 A3 | 9/2003 |
| WO | WO 03/097450 A1 | 11/2003 |
| WO | WO 03/097451 A1 | 11/2003 |
| WO | WO 2004/000642 A1 | 12/2003 |
| WO | WO 2004/074091 A2 | 9/2004 |
| WO | WO 2004/087499 A2 | 10/2004 |
| WO | WO 2005/002960 A1 | 1/2005 |
| WO | WO 2005/007508 A1 | 1/2005 |
| WO | WO 2006/061617 A1 | 6/2006 |
| WO | WO 2006/085919 A2 | 8/2006 |
| WO | WO 2006/137880 A2 | 12/2006 |
| WO | WO 2007/036038 A1 | 4/2007 |
| WO | WO 2007/037932 A2 | 4/2007 |
| WO | WO 2007/045091 A1 | 4/2007 |
| WO | WO 2007/065649 A2 | 6/2007 |

OTHER PUBLICATIONS

International Search Report and Written Opinion for Int'l Appln. No. PCT/US2001/044102, dated Feb. 16, 2012 (18 pages).
21$^{st}$ Century Airships Web Site, accessed Jun. 22, 2007, http://www.21stcenturyairships.com (5 pages).
ALA-40 proof-of-concept—Thermoplane, Photos from "Janes—All the World's Aircraft," 1997 (2 pages).
Ben Ionnatta, "Spy Blimps and Heavy Lifters: The Latest Thing in Airships," Air & Space Smithsonian, Sep. 2007 (2 pages).
Blimp Europa N2A Web Site, accessed Oct. 11, 2006, machine translated Jun. 25, 2007, http://www.blimp-n2a.com/cl5alpha.htm (3 pages).
CargoLifter Web Site, accessed Jun. 19, 2007, http://cargolifter.info (2 pages).
Daniel P. Raymer, "Aircraft Design: A Conceptual Approach," 4$^{th}$ Ed., 2006, pp. 652-59, American Institute of Aeronautics and Astronautics, Inc., Reston, Virginia (11 pages).

(56) References Cited

OTHER PUBLICATIONS

Demonstrator Alpha, Lenticular Aircraft of Air Photography, accessed Oct. 11, 2006, machine translated Jun. 25, 2007, http://perso.orange.fr/balaskovic/actu-texte.html (2 pages).
Dynalifter Web Site, accessed Jun. 22, 2007, http://www.dynalifter.com (7 pages).
"Lift Equations," derived from "The Non-Rigid Airship Test and Evaluation Manual," U.S. Navy, 1940 (2 pages).
Michael A. Dornheim, "Skunks Working," Aviation Week, Feb. 6, 2006, accessed Jun. 22, 2007, http://www.aviationweek.com/aw/generic/story_generic.jsp?channel=awst&id=news/020606p2.xml (2 pages).
Gabriel A. Khoury and J. David Gillett, "Lenticular Mathematics," an excerpt from "Airship Technology," Cambridge University Press, 1999 (6 pages).
Lord Ventry and Eugene Kolesnik, Excerpt from "Jane's Pocket Book of Airships," Collier Books, 1977, pp. 94-96 (6 pages).
Edwin Mowforth, "Lenticular History," an excerpt from "An Introduction to the Airship," Second Edition, 2001, and information sheet (7 pages).
Operation-LTA Web Site, accessed Oct. 11, 2006, http://web.archive.org/web/20040405173243/www.operation-lta.com (5 pages).
Stephane Doncieux and Jean-Arcady Meyer, "Evolving Neural Networks for the Control of a Lenticular Blimp," AnimatLab—LIP6, 2003, France, http://animatlab.lip6.fr (12 pages).
Thomas F. Norton, "Now There's a 'Personal Blimp:' Unique Foldable Frame Makes it Practical as a Second Century Aircraft," General Aviation News, Jan. 19, 2007, p. 18-19, $59^{th}$ year, No. 2, Flyer Media, Inc., Lakewood, WA (2 pages).
Worldwide Aeros Corporation Web Site, accessed Jun. 22, 2007, http://www.aerosml.com (4 pages).
Yu. Boiko and V.A. Turian, "Dreamboat of Centuries," Moscow, Machine Building, p. 52, Jun. 13, 1991 (3 pages).
U.S. Army Advanced Materiel Concepts Agency, "Aerial Very Heavy Lift Concepts for the 1990 Army vol. I", Basic Report, Nov. 1969 (41 pages).
U.S. Army Advanced Materiel Concepts Agency, "Aerial Very Heavy Lift Concepts for the 1990 Army vol. III," Academic and Industrial Presentations, Nov. 1, 1969 (200 pages).
Boeing Vertol Company for NASA Ames., "Feasibility Study of Modern Airships", Final Report, vol. 1, May 1975 (478 pages).
P.A. Mackrodt, "Further Studies in the Concept of Delta-Winged Hybrid Airships", J. Aircraft, Oct. 1, 1980, pp. 734-740 (7 pages).
Mark D. Ardema, "Missions and Vehicle Concepts for Modern, Propelled, Lighter-Than-Air Vehicles", AGARD, NATO, Feb. 1985 (50 pages).
Dr. R.S. Ross et al., "New Air Transport System for Heavy Bulky Cargo" (Advanced Copy), Apr. 20, 1962 (35 pages).
W.L. Marcy, "Parametric Study of Advanced Fully-Buoyant Naval Air Vehicles", NADC, Nov. 30, 1976 (86 pages).
Stepler, Richard M., "Return to Lighter Than Air Transportation for Military and Civilian Application", Defense Systems Management School, Fort Belvoir, VA, Nov. 1973 (56 pages).
L. Balis Crema et al., "Some Trends in Airship Technology Developments", NATO, Apr. 10-15, 1983 (14 pages).
"Types of Lighter-Than-Air Aircraft," Author unknown, Publication date unknown (34 pages).
Mark D. Ardema, "Vehicle Concepts and Technology Requirements for Buoyant Heavy-Lift Systems", NASA, 1979 (36 pages).
Mark D. Ardema, "Vehicle Concepts and Technology Requirements for Buoyant Heavy-Lift Systems", NASA Technical Paper, 1981 (18 pages).
David Bailey and William Mueller, "North Warning Airship Program, Final Overview," Naval Air Development Center, Apr. 6, 1987 (211 pages).
"Preliminary Design Investigation for New Payload and Ground Handling Concepts for Airships Operating in Remote Arctic Regions, Final Report," Naval Air Development Center, Mar. 31, 1986 (226 pages).
Capt. J. Arvi et al., "North Warning Program Airship Feasibility Tests, Final Report," Naval Air Development Center, Feb. 20, 1987 (42 pages).
Capt. J. Arvi et al., "North Warning System Familiarisation, Feasibility and Operational Demonstration, Final Report," Naval Air Development Center, Apr. 19, 1986 (133 pages).
Douglas Botting, "The Giant Airships," Time-Life Books, Alexandria, VA 1980 (185 pages).
E. Udartsev and E. Tyan, "Dirigible of a New Generation in Kiev," available at http://www.aviajournal.com/sections/journal/arh/magazine/200112/index.html, Dec. 2001. (9 pages).
Edwin Mowforth, "An Introduction to the Airship," Third Edition, The Airship Association, Sep. 2007 (157 pages).
Construction Cost Management Co., "With Us, Future Comes Faster," available at http://www.buildcostcontrol.com/Airship/tabid/640/Default.aspx, 2008 (1 page).
Future Flight?, Leslie Deane, Ballooning, The Journal of the Balloon Federation of America, Jul./Aug. 2008, pp. 26-32 (7 pages).
Repoulias et al., "Dynamically Feasible Trajectory and Open-Loop Control Design for Unmanned Airships," 2007 Mediterranean Conference on Control and Automation, Jul. 27, 2007, XP002511581, Athens, Greece (6 pages).
Nagabhushan et al., "Directional control of an advanced airship," AIAA Lighter-Than-Air Systems Technology Conference, 11th, Clearwater Beach, FL, May 15-18, 1995, Technical Papers (A95-30317 07-01), Washington, DC, American Institute of Aeronautics and Astronautics, May 15, 1995, pp. 107-116 (10 pages).
PCT report of partial international search regarding PCT/US2007/021962 dated Dec. 2, 2008.
PCT International Search Report re PCT/US2007/021962, dated Mar. 4, 2009.
PCT International Search Report re PCT/US2008/009453, dated Apr. 3, 2009.
http://dynalifter.com/, accessed Dec. 1, 2009 (23 pages).
http://hybridairvehicles.net/index.html, accessed Dec. 1, 2009 (16 pages).
http://www.skylifter.com.au/, accessed Dec. 1, 2009 (18 pages).
International Search Report and the Written Opinion dated Oct. 8, 2012, in counterpart International Application No. PCT/US2012/030562, 24 pages.
Luffman, "Aeroraft the Alternative Aircraft for Heavy Lift Transport or Crane Use," American Institute of Aeronautics and Astronautics, AIAA's 3rd Annual Aviation Technology, Integration, and Operations (ATIO) Tech, Nov. 17-19, 2003, Denver, Colorado, AIAA 2003-6754, pp. 1-13 (13 pages).
European Examination Report from EP Application No. 08 827 387.5-1254, dated Jun. 1, 2010. (4 pages).
European Examination Report from EP Application No. 07 873 810.1-2422, dated Aug. 16, 2010. (4 pages).
Office Action dated Sep. 3, 2009, from U.S. Appl. No. 11/907,883. (16 pages).
Final Office Action dated Apr. 1, 2010, from U.S. Appl. No. 11/907,883. (13 pages).
Advisory Action dated Aug. 3, 2010, from U.S. Appl. No. 11/907,883. (3 pages).
Amendment After Final dated Aug. 17, 2010, from U.S. Appl. No. 11/907,883. (28 pages).
Notice of Allowance dated Sep. 1, 2010, from U.S. Appl. No. 11/907,883. (4 pages).
PCT Communication Relating to the Results of the Partial International Search re PCT/US2008/009453, dated Feb. 4, 2009.
Ahmed Ghanmi and Abderrahmane Sokri, "Airships for military logistics heavy lift: A performance assessment for Northern operation applications," Defence R&D Canada—CORA, Technical Memorandum, Jan. 2010 (63 pages).
Edwin Mowforth, "Lenticular History," an excerpt from "An Introduction to the Airship," Second Edition, 2001, (6 pages).
http://www.hybridairvehicles.net/index.html, accessed Dec. 1, 2009 (16 pages).
International Search Report and Written Opinion dated Jul. 26, 2012 in counterpart international application No. PCT/US2012/023954 (14 pages).

(56) References Cited

OTHER PUBLICATIONS

PCT International Search Report re PCT/US2007/021962, dated Apr. 3, 2009 (21 pages).
PCT International Search Report re PCT/US2008/009453, dated Apr. 3, 2009 (21 pages).
Written Opinion of the International Searching Authority for International Application No. PCT/US2014/063675 dated Oct. 12, 2015 (17 pages).

* cited by examiner

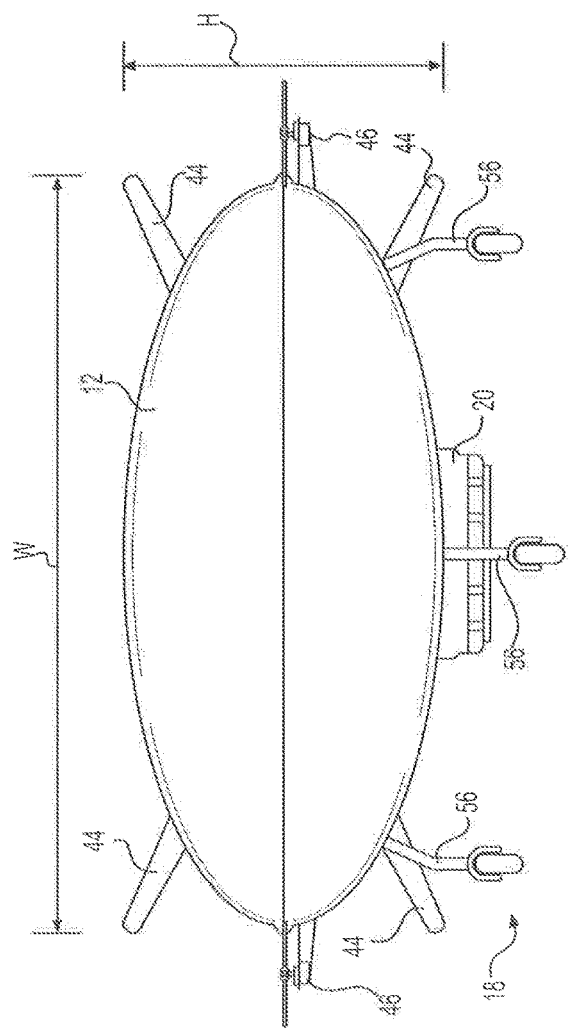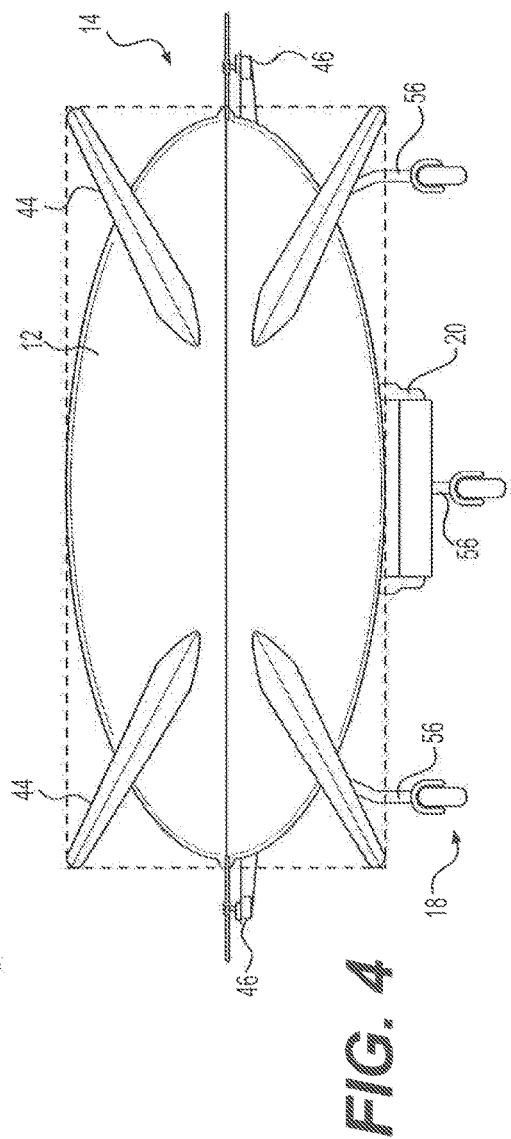
FIG. 3
FIG. 4

CARGO AIRSHIP

PRIORITY CLAIM

This application claims priority under 35 U.S.C. §119 to U.S. Provisional Patent Application No. 61/899,574, filed Nov. 4, 2013, U.S. Provisional Patent Application No. 61/988,584, filed May 5, 2014, and U.S. Provisional Application No. 62/055,978, filed Sep. 26, 2014, each of which is hereby incorporated by reference in its entirety.

TECHNICAL FIELD

The present disclosure relates to an airship. More particularly, the disclosure relates to cargo airship and associated features.

BACKGROUND

Aerostatic lighter-than-air airships have seen substantial use since 1783 following the first successful manned flight of the Montgolfier brothers' hot air balloon. Numerous improvements have been made since that time, but the design and concept of manned hot air balloons remains substantially similar. Such designs may include a gondola for carrying a pilot and passengers, a heating device (e.g., a propane torch), and a large envelope or bag affixed to the gondola and configured to be filled with air. The pilot may then utilize the heating device to heat the air until the buoyant forces of the heated air exert sufficient force on the envelope to lift the balloon and an attached gondola. Navigation of such an airship has proven to be difficult, mainly due to wind currents and lack of propulsion units for directing the balloon.

To improve on the concept of lighter-than-air flight, some lighter-than-air airships have evolved to include propulsion units, navigational instruments, and flight controls. Such additions may enable a pilot of such an airship to direct the thrust of the propulsion units in such a direction as to cause the airship to proceed as desired. Airships utilizing propulsion units and navigational instruments typically do not use hot air as a lifting gas (although hot air may be used), with many pilots instead preferring lighter-than-air lifting gases such as hydrogen and helium. These airships may also include an envelope for retaining the lighter-than-air gas, a crew area, and a cargo area, among other things. The airships are typically streamlined in a blimp- or zeppelin-like shape, which, while providing reduced drag, may subject the airship to adverse aeronautic effects (e.g., weather cocking, a.k.a. wind cocking).

Airships other than traditional hot air balloons may be divided into several classes of construction: rigid, semi-rigid, non-rigid, and hybrid type. Rigid airships typically possess rigid frames containing multiple, non-pressurized gas cells or balloons to provide lift. Such airships generally do not depend on internal pressure of the gas cells to maintain the shape of the airships. Semi-rigid airships generally utilize some pressure within a gas envelope to maintain the shape of the airships, but may also have frames along a lower portion of the envelope for purposes of distributing suspension loads into the envelope and for allowing lower envelope pressures, among other things. Non-rigid airships typically utilize a pressure level in excess of the surrounding air pressure in order to retain their shape, and any load associated with cargo carrying devices is supported by the gas envelope and associated fabric. The commonly used blimp is an example of a non-rigid airship.

Hybrid airships may incorporate elements from other airship types, such as a frame for supporting loads and an envelope utilizing pressure associated with a lifting gas to maintain its shape. Hybrid airships also may combine characteristics of heavier-than-air airship (e.g., airplanes and helicopters) and lighter-than-air technology to generate additional lift and stability. It should be noted that many airships, when fully loaded with cargo and fuel, may be heavier than air and thus may use their propulsion system and shape to generate aerodynamic lift necessary to stay aloft. However, in the case of a hybrid airship, the weight of the airship and cargo may be substantially compensated for by lift generated by forces associated with a lifting gas such as, for example, helium. These forces may be exerted on the envelope, while supplementary lift may result from aerodynamic lift forces associated with the hull.

A lift force (i.e., buoyancy) associated with a lighter-than-air gas may depend on numerous factors, including ambient pressure and temperature, among other things. For example, at sea level, approximately one cubic meter of helium may balance a mass of approximately one kilogram. Therefore, an airship may include a correspondingly large envelope with which to maintain sufficient lifting gas to lift the mass of the airship. Airships configured for lifting heavy cargo may utilize an envelope sized as desired for the load to be lifted.

Landing and securing a lighter-than-air airship may also present unique problems based on susceptibility to adverse aerodynamic forces. Although many lighter-than-air airships may perform "vertical takeoff and landing" (VTOL) maneuvers, once such an airship reaches a point near the ground, a final landing phase may entail ready access to a ground crew (e.g., several people), environment monitoring systems, and/or a docking apparatus for tying or otherwise securing the airship to the ground. Without access to such elements, the airship may be carried away by wind currents or other uncontrollable forces while a pilot of the airship attempts to exit and handle the final landing phase. Therefore, systems and methods enabling landing and securing of an airship by one or more pilots may be desirable.

Due to the various features of airships, such as adaptability in takeoff/landing abilities, lifting capacity, and maneuverability, there are many potential uses of airships. For example, airships may be particularly suitable for transporting cargo. Other options for transporting cargo, especially heavy cargo, have limitations. In particular, airplanes, and vehicles, and ships may require certain infrastructures and/or environmental conditions (e.g., runways, roads, waterways, etc.), while airships, with VTOL and hovering capabilities, have greater flexibility to receive, transport, and deliver cargo to a variety of different locations. Thus, an airship that is adapted for a variety of transport functions is desirable.

Further, in order to accommodate these and other potential uses of airships, it is necessary to incorporate various controls that allow the airship to perform certain operations, such as a hover operation. In one example, an airship may approach a landing area, hover near the landing area, perform an operation (e.g., exchange cargo), and depart from the hovering position. It may be difficult, however, for a pilot to consistently and easily maintain the airship in a particular hovering position, because the aerodynamic forces on a hovering airship may widely vary depending on the conditions at the time. Factors such as wind speed, wind direction, wind frequency, turbulence conditions, airship weigh and balance, airship heading etc., and the consideration of these factors may cause operation of the airship to be complicated during hovering (as well as approach and departure). Thus, systems and methods for improved flight planning and easing control of an airship, and particularly an airship during a hovering maneuver, are desirable.

The present disclosure is directed to addressing one or more of the desires discussed above utilizing various exemplary embodiments of an airship.

SUMMARY

In one aspect, an airship is disclosed. The airship may include a hull configured to contain a gas and at least one propulsion assembly coupled to the airship and including a propulsion device. The airship may also include a payload bay comprising an external cargo area located outside of the hull. The airship may further include a cargo handling system comprising at least one hoisting mechanism configured to lift cargo into the external cargo area while the airship is hovering.

In another aspect, an airship is disclosed. The airship may include a gondola forming at least a portion of a keel and including a cockpit. The airship may further include a cargo bay comprising an external cargo area formed by the keel. The airship may also include at least one hoisting mechanism configured to lift cargo into the external cargo area from the ground while the airship is hovering, and a tunnel that runs longitudinally along the payload bay, the at least one hoisting mechanism configured to move longitudinally in the tunnel to thereby move cargo longitudinally along the keel. The airship may further include a locking mechanism configured to secure the cargo to the keel and a control station located in the cockpit and configured to allow a passenger to control the cargo handling system.

In another aspect, a flight control system for an airship including a hull configured to contain a gas, and a propulsion assembly is disclosed. The flight control system may include memory storing instructions and one or more processors configured to execute the instructions to estimate environmental factors associated with a cargo transfer location during a future time period associated with a flight mission. The one or more processors may be further configured to determine an effect of the estimated environmental factors on aerostatic lift and airship stability, determine a route map for the flight mission based at least on the effect of the estimated environmental factors and an anticipated cargo transfer mode, and display the route map on a display associated with the airship.

In another aspect an airship is disclosed that may include a hull. The hull may include a rigid frame, an outer envelope surrounding the rigid frame, and a plurality of cells attached to the rigid frame and configured to contain a gas. The airship may further include a fin assembly attached to the hull, a gondola attached to the hull, and a landing gear assembly. The hull may include an elongated lenticular shape in which a height of the hull is less than half of a width of the hull and less than one third of the length of the hull, and the width of the hull is approximately one half of the length of the hull.

In yet another aspect, an airship is disclosed that may include a hull including a convex lower portion and a convex upper portion. The hull may include a rigid frame, an outer envelope surrounding the rigid frame, and a plurality of cells attached to the rigid frame and configured to contain a gas. The airship may further include a propulsion system including a plurality of propulsion assemblies, a fin assembly attached to the hull including a plurality of stabilizing fins, and a gondola attached to the hull. In addition, the plurality of propulsion assemblies may be secured to the lower portion of the hull, including at least two propulsions assemblies secured on a port side of the hull and at least two propulsion assemblies secured on a starboard side of the hull. Further, the stabilizing fins may be arranged in an X-configuration.

In yet another aspect, a method of delivering cargo to a remote location with an airship is disclosed. The method may include securing at least one shipping container to an external cargo area of the airship, the shipping container containing cargo. The method may further include traveling to the remote location. The method may also include delivering the shipping container, including lowering the shipping container to the ground with a hoisting mechanism.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 3 illustrates a front-view of an airship, consistent with disclosed embodiments;

FIG. 4 illustrates a rear-view of the airship, consistent with disclosed embodiments;

DETAILED DESCRIPTION

Reference will now be made in detail to the drawings. Wherever convenient, the same reference numbers will be used throughout the drawings to refer to the same or like parts.

The accompanying figures depict exemplary embodiments of a cargo airship. The cargo airship includes features that enable a variety of cargo transport operations. For example, the cargo airship may include features that provide tailored flight planning capabilities that consider various aspects of a future cargo transport operation, such as environmental factors that may affect the operation. Further, the cargo airship may include certain features that allow for the safe and efficient execution of the cargo transport operation. For example, the cargo airship may include cargo handling systems that are adapted for transporting heavy cargo and quickly exchanging the cargo once the airship has arrived at a delivery location. Further, the cargo airship may include an optimized shape designed for the particular requirements of receiving, transporting, and delivering cargo.

Also, it should be evident that transportation of cargo is only one exemplary application of the disclosed airship, and that the features and configurations of the airship described herein are useful for many different airship uses and functions. For example, an airship consistent with the disclosed embodiments may be configured to act as a mobile medical facility configured to provide medical services to remote locations.

Figure 1:
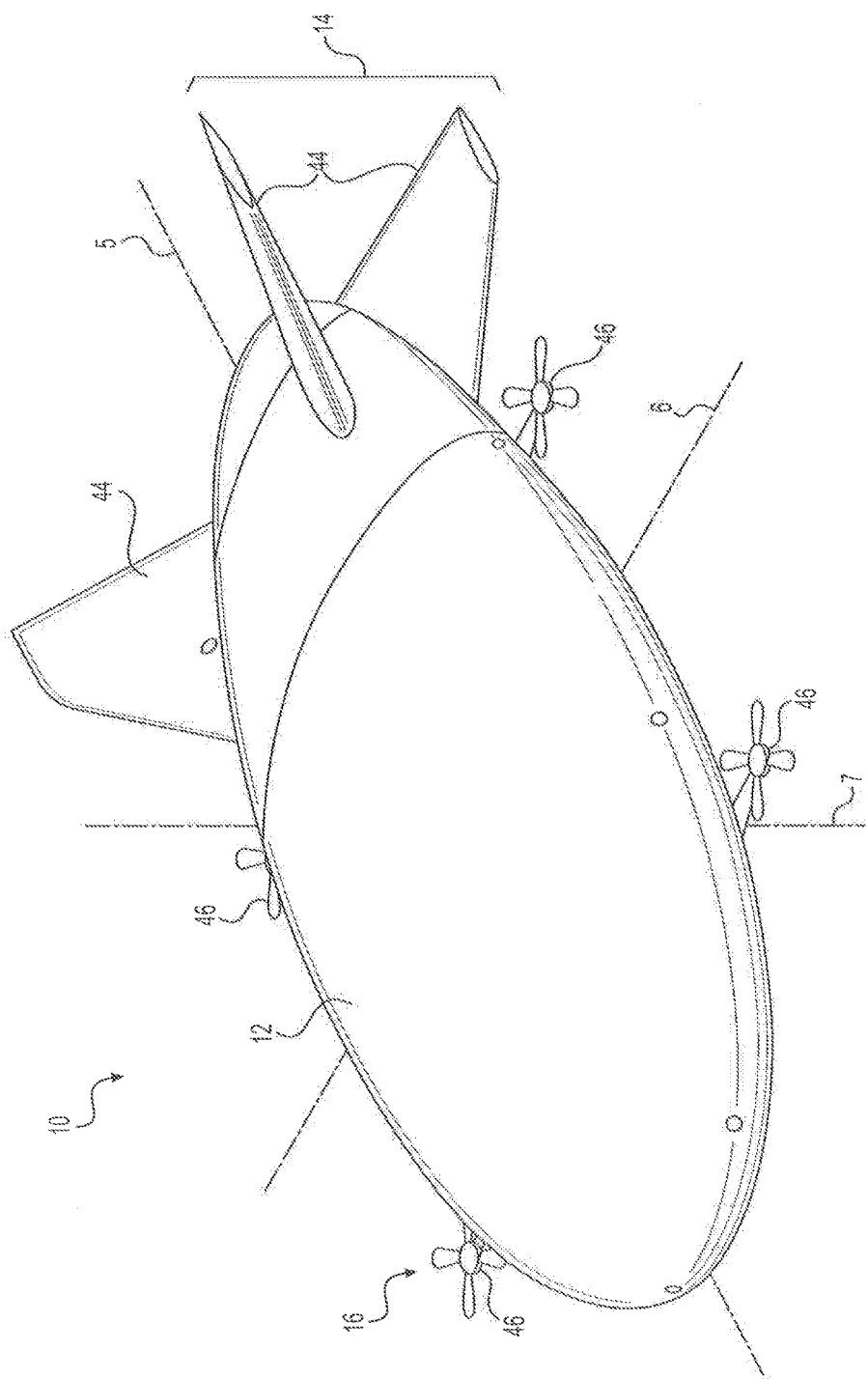
FIG. 1 illustrates an exemplary embodiment of a cargo airship, consistent with disclosed embodiments.

FIG. 1 illustrates one exemplary embodiment of an airship 10. Airship 10 may be configured for VTOL, navigation in three dimensions (e.g., X, Y, and Z planes), as well as various specific flight operations, such as hovering above a land or water. To facilitate these and other flight operations, airship 10 may include a hull 12, a fin assembly 14, a propulsion system 16, a landing gear assembly 18 (see FIGS. 3-4), a gondola 20 (see FIGS. 11-12), a cargo handling system 22 (see FIGS. 16-21), and a flight control system 24 (see FIG. 22).

Throughout this discussion of various embodiments, the terms "front" and/or "fore" will be used to refer to areas within a section of airship 10 closest to forward travel, and the term "rear" and/or "aft" will be used to refer to areas within a section of airship 10 closest to the opposite direction of travel. Moreover, the term "tail" will be used to refer to a rear-most point associated with hull 12, while the term "nose" will be used to refer to the forward-most point within the front section of hull 12.

FIG. 1 further illustrates various axes relative to the exemplary airship 10 for reference purposes. Airship 10 may include a roll axis 5, a pitch axis 6, and a yaw axis 7. Roll axis 5 of airship 10 may correspond with an imaginary line running through hull 12 in a direction from, for example, the tail to the nose of airship 10. Yaw axis 7 of airship 10 may be a central, vertical axis corresponding with an imaginary line running perpendicular to roll axis 5 through hull 12 in a direction from, for example, a bottom surface of hull 12 to a top surface of hull 12. Pitch axis 6 may correspond to an imaginary line running perpendicular to both yaw and roll axes, such that pitch axis 6 runs through hull 12 from one side of airship 10 to the other side of airship 10, as shown in FIG. 1. "Roll axis" and "X axis," "pitch axis" and "Y axis," and "yaw axis" and "Z axis" may be used interchangeably throughout this discussion to refer to the various axes associated with airship 10. One of ordinary skill in the art will recognize that the terms described in this paragraph are exemplary only and not intended to be limiting.

Hull

Hull 12 may include a support structure 26 (see FIG. 2), and one or more layers of material (FIG. 6) substantially covering support structure 26. In some embodiments, airship 10 may be a "rigid" airship. As used herein, the term "rigid airship" shall refer to an airship having a rigid framework, and containing one or more non-pressurized gas cells or bladders to provide lift, wherein the hull of the airship does not depend on internal pressure of the gas cells to maintain its shape.

Figure 2:
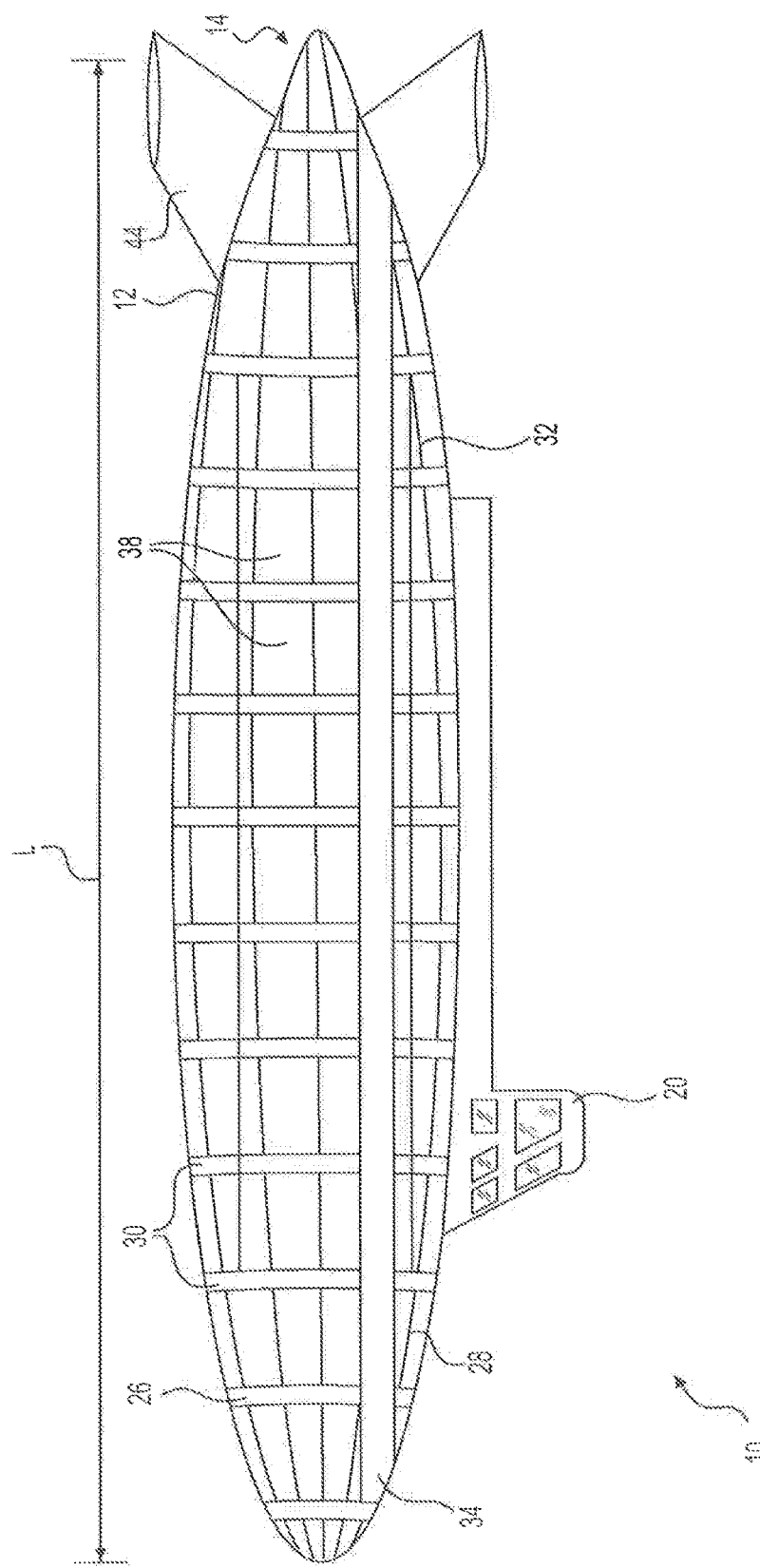
FIG. 2 illustrates an exemplary support structure of an airship, consistent with disclosed embodiments.

FIGS. 2-4 illustrate an exemplary shape of hull 12 that may be at least partially defined by support structure 26. In particular, hull 12 of airship 10 may include a length L (FIG. 2), a height H (FIG. 3), and a width W (FIG. 3). In an exemplary embodiment, hull 12 may include an elongated lenticular shape defined by height H being less than half of width W and less than one third of length L. In one embodiment, height H may be less than one fourth of length L, such that length L may be twice width W. In an exemplary embodiment, opposing upper and lower sides of hull 12 may include substantially symmetrical convex shapes. In some embodiments, an interconnecting support ring may surround hull 12 at an intersection of the upper and lower sides of hull 12.

FIG. 2 illustrates support structure 26 according to some embodiments of the present disclosure. In one embodiment, support structure 26 may be configured to define a shape associated with airship 10, while providing support to numerous systems associated with airship 10. As shown in FIG. 2, support structure 26 may be defined by one or more frame members 28 interconnected to form the desired shape.

In an exemplary embodiment, frame members 28 may include a plurality of structural rings 30 interconnected by a plurality of longerons 32, and at least one structural beam 34. In one embodiment, the plurality of structural rings 30 may include approximately 11-12 vertically-mounted ring-shaped truss structures evenly spaced along hull 12. The plurality of longerons 32 may include a plurality of primary longerons that run horizontally from the nose of airship 10 to the tail. The plurality of longerons 32 may also include a plurality of intermediate longerons interconnected between and shorter than the primary longerons. Structural beam 34 may be a longitudinal truss member, larger than longerons 32, running fore and aft through the air ship, providing extra rigidity and distributing loads (e.g., gas cell lift loads, cargo loads, etc.) evenly throughout support structure 26.

Figure 5:
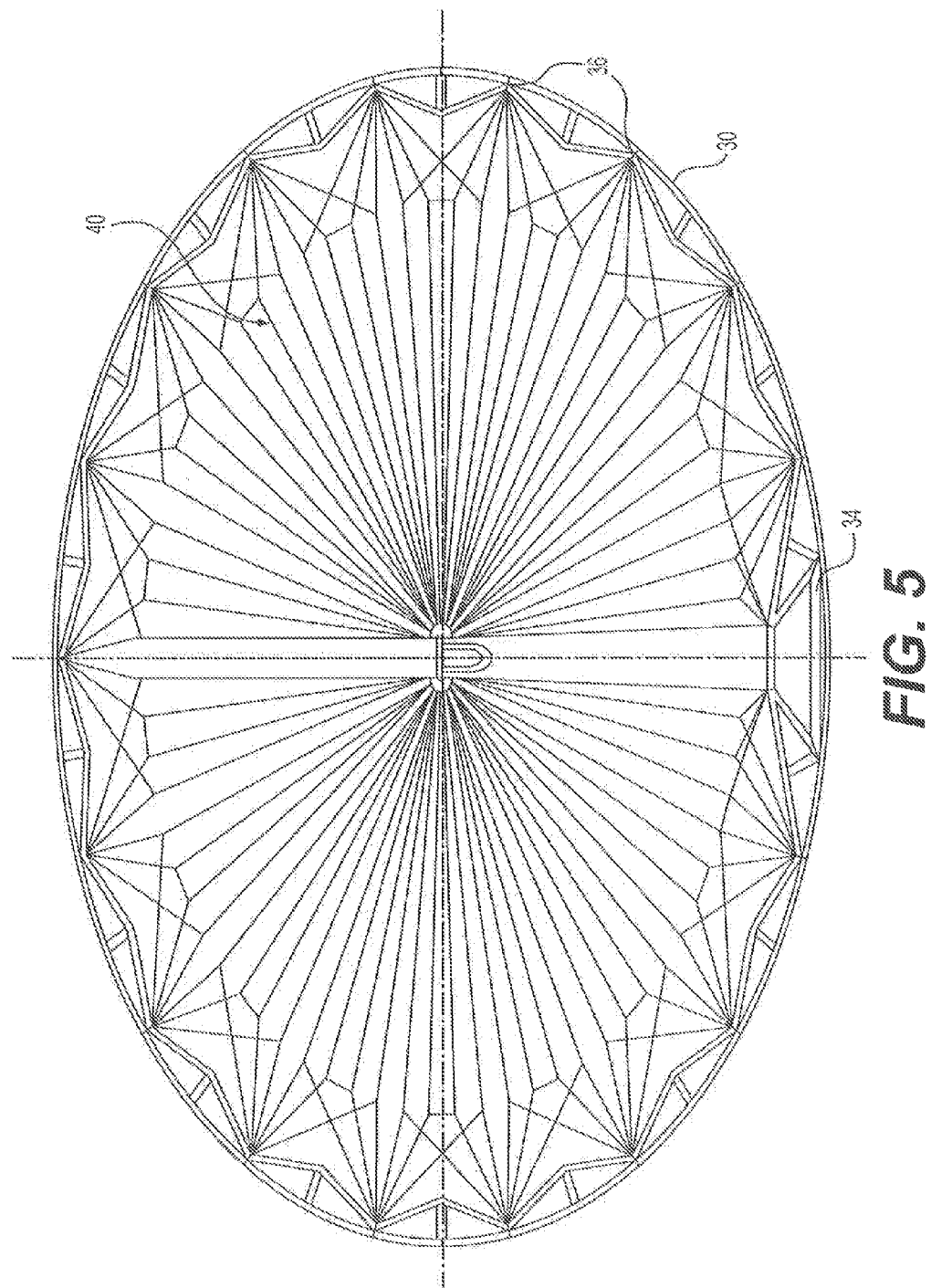
FIG. 5 illustrates an exemplary structural ring that may be used in conjunction with the support structure of FIG. 2, consistent with disclosed embodiments.

FIG. 5 illustrates a cross section of support structure 26, depicting structural ring 30 and structural beams 34. Structural ring 30 and structural beam 34 include truss structures, formed by a plurality of interconnected frame components. The truss structure of structural ring 30 may form a plurality of attachment points 36 around a circumference of each structural ring 30. Structural beam 34 may be positioned at a lower-most point of structural rings 30, running perpendicular to a plane of structural ring 30. Additional or alternative structural beams 34 (not shown) may be positioned around the circumference of structural rings 30.

To maximize a lifting capacity associated with airship 10, it may be desirable to design and fabricate support structure 26 such that a weight associated with support structure 26 is minimized while strength, and therefore resistance to aerodynamic forces, for example, is maximized. In other words, maximizing a strength-to-weight ratio associated with support structure 26 may provide a more desirable configuration for airship 10. For example, one or more frame members 28 may be constructed from light-weight, but high-strength, materials including, for example, aluminum, composite materials, and/or carbon fiber, among other things. In one embodiment, structural rings 30, the primary longerons of longerons 32 and structural beam(s) 34 are fabricated from aluminum, while the intermediate longerons of longerons 32 are fabricated from composite materials.

Hull 12 may be configured to retain a volume of lighter-than-air gas. As shown in FIG. 2, hull 12 may contain a plurality of gas cells 38. Gas cells 38 may be individual bladders, each configured to retain a volume of lighter-than-air gas, such as helium. Each gas cell 38 may be fabricated from a lightweight fabric material and may include one or more valves to accommodate overpressure of the gas at high altitudes or severe superheat conditions.

In an exemplary embodiment, each gas cell 38 may be an individual cylindrical segment, shaped to fit its location within hull 12. The use of separately positioned gas cells 38 for containing the gas may help minimize sloshing of the gas during flight and helps avoid collection of too much gas in the nose or tail areas (e.g., during pitch up and pitch down maneuvers). Gas cells 38 may be positioned between adjacent structural rings 30. In an exemplary embodiment, securing members 40 may be secured to attachment points 36 around structural rings 30 (see FIGS. 5-6) and configured to help maintain a position of each gas cell 38 within hull 12.

In an exemplary embodiment, securing members 40 may be netting, cables, ropes, or the like. For example, securing members 40 may be high-strength netting material secured to attachment points 36. As airship 10 travels between different altitudes, a pressure inside each gas cell 38 may change, causing gas cells 38 to increase and decrease in size. Securing members 40 may maintain each gas cell 38 in its own segment of hull 12 (e.g., between adjacent structural rings 30), while not constraining expansion/contraction caused by changes in pressure.

Figure 6:
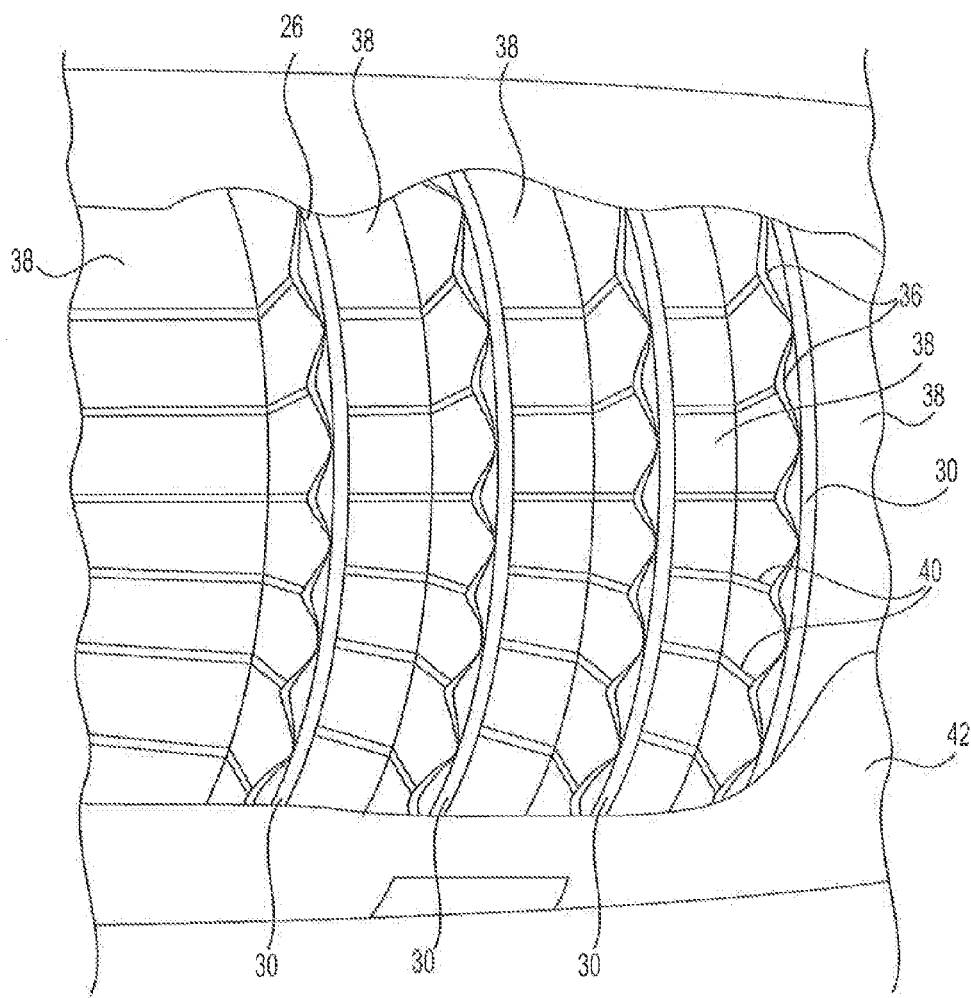
FIG. 6 further illustrates a hull of an airship, consistent with disclosed embodiments.
Figure 7:
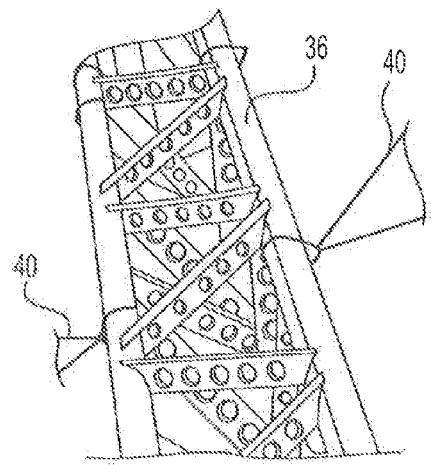
FIG. 7 illustrates an exemplary truss structure, consistent with disclosed embodiments.

As shown in FIG. 6, gas cells 38 may be positioned inside support structure 26 such that a gas lift force is transferred to support structure 26. An outer skin 42 may be secured around an outside of support structure 26 to serve as an external surface of hull 12, as well as to envelop support structure 26 and gas cells 38. Outer skin 42 may be an aviation-approved fabric that is mechanically attached or glued to the exterior surface of support structure 26. FIG. 7 further depicts a truss structure that may be used for one or more components of support structure 26 (e.g., structural rings 30, structural beam 34, etc.) and to which securing members 40 may be secured to help hold gas cells 38 in place within hull 12.

In an exemplary embodiment, hull 12 may configured such that airship 10 includes a "near equilibrium" design in which airship 10 relies primarily on static lift of the gas retaining in gas cells 38 and not on any dynamic lift that may be generated by hull 12 during flight. In an exemplary embodiment, hull 12 may include a hull fineness ratio of approximately 3 to 1.

Fin Assembly

Returning to FIGS. 1-4, fin assembly 14 may include a plurality of stabilizing fins 44 secured to hull 12 (e.g., mounted to support structure 26). Stabilizing fins 44 may be arranged in a wide "X" configuration at the rear of hull 12. In an exemplary embodiment, fin assembly 14 may be configured such that stabilizing fins 44 do not extend beyond the length, width, or height of hull 12. This configuration may create a compact design, reducing the size of a hangar required to house airship 10. Further, the wide "X" configuration of stabilizing fins 44 may help reduce snow accumulation and improve ground clearance. In an exemplary embodiment, control mechanisms may allow for adjustment of stabilizing fins 44.

Propulsion System

Propulsion system 16 may include a plurality of propulsion assemblies 46 positioned around a perimeter of hull 12. As shown in FIG. 1, in one embodiment, propulsion system 16 may include four propulsion assemblies 46. For example, two propulsion assemblies 46 may be mounted to a lower starboard side mid-section of hull 12 and two propulsion assemblies 46 may be mounted to a lower port side mid-section of hull 12. It should be understood, however, that propulsion system 16 may include more or less propulsion assemblies 46, depending on the lift and maneuverability requirements of airship 10. For example, in some embodiments, propulsion system 16 may include six propulsion assemblies 46.

Propulsion assemblies 46 may be configured to provide a propulsive force (e.g., thrust), directed in a particular direction (i.e., a thrust vector), and configured to generate motion (e.g., horizontal and/or vertical motion), counteract a motive force (e.g., wind forces), and/or other manipulations and maneuvers of airship 10 (e.g., yaw control). For example, propulsion assemblies 46 may enable yaw, pitch, and roll control as well as providing thrust for horizontal and vertical motion.

Figure 8:
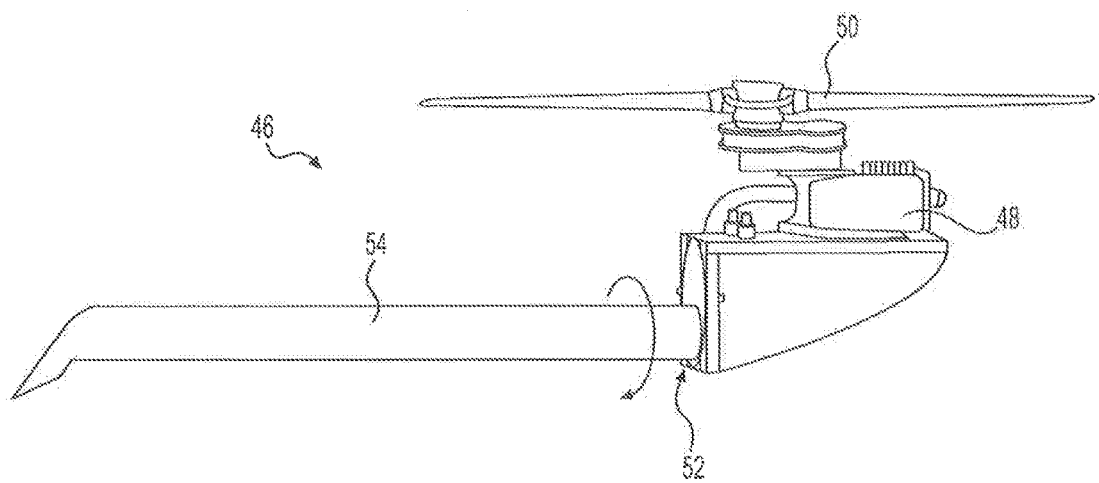
FIG. 8 illustrates an exemplary propulsion assembly, consistent with disclosed embodiments.

FIG. 8 illustrates an exemplary embodiment of propulsion assemblies 46. For example, as shown in FIG. 8, propulsion assemblies 46 may include a power source 48, a propulsion device 50, and a propulsion unit mount 52. Power source 48 may be operatively coupled to and configured to drive propulsion device 50. Power source 48 may include, for example, liquid-fuel engines, electric motors, gas turbine engines, and/or any suitable power source configured to generate rotational power. Power source 48 may further include variable-speed and/or reversible type motors that may be run in either direction (e.g., rotated clockwise or counterclockwise) and/or at varying rotational speeds based on control signals (e.g., signals from flight control system 24). Power source 48 may be powered by gasoline, diesel fuel, natural gas, methane, batteries, solar energy, and/or any other suitable fuel source.

Figure 10:
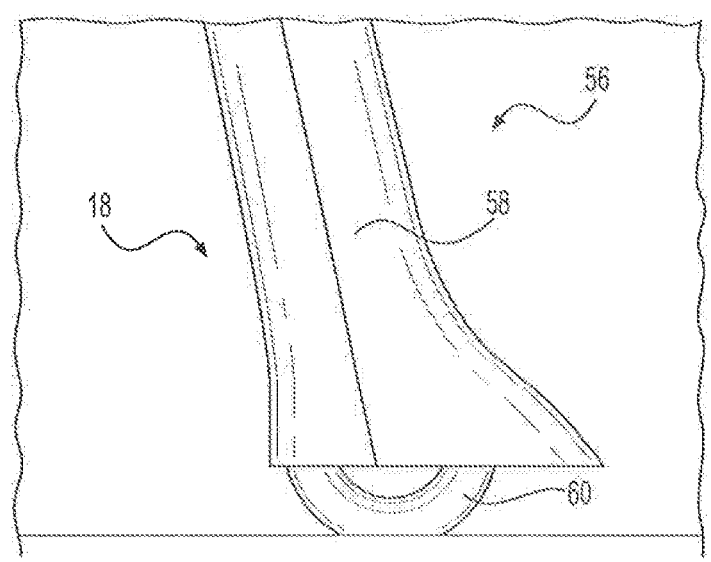

As shown in FIG. 8, each propulsion assembly 46 may include a propulsion device 50 configured to convert the rotational energy of power source 48 into a thrust force suitable for acting on airship 10. For example, propulsion device 50 may include a device, such as an airfoil that, when rotated, may generate an airflow or thrust. For example, propulsion device 50 may be arranged as an axial fan (e.g., propeller, as shown in FIG. 10), a centrifugal fan, and/or a tangential fan. Such exemplary fan arrangements may be suited to transforming rotational energy produced by power source 48 (e.g., via a power conversion unit) into a thrust force useful for manipulating airship 10. One of ordinary skill in the art will recognize that numerous configurations may be utilized without departing from the scope of the present disclosure.

As shown in FIG. 8, for example, propulsion unit mount 52 may include at least one pylon 54 configured to secure power source 48 and propulsion device 50 to hull 12 (FIG. 1) such that forces associated with propulsion assemblies 46 may be transferred to hull 12. Pylon 54 may be arranged to provide sufficient clearance for propulsion device 50 with respect to hull 14 to allow propulsion devices 50 to rotate in a substantially horizontal plane to provide vertical thrust and enable hovering and vertical takeoff operations.

Propulsion assembly 46 may be adjustable such that an intensity and vector direction of propulsion device 50 may be modified. For example, pylon 54 may be adjustable (e.g., rotatable) to adjust a direction of thrust produced by propulsion device 50. For instance, each of pylons 54 may be individually and/or collectively adjustable to adjust a thrust angle of propulsion device(s) 50 to move airship 10 in three dimensions between, for example, a vertical plane for producing horizontal thrust and a horizontal plane for producing vertical thrust. In addition (or alternatively), where propulsion device 50 is configured as an adjustable airfoil (e.g., variable-pitch propellers), the angle of attack of propulsion device 50 may be adjusted to accomplish a complete thrust reversal. Propulsion device 50 may also be configured with, for example, vanes, ports, and/or other devices, such that a thrust generated by propulsion device 50 may be modified and directed in a desired direction.

Landing Gear Assembly

As shown in FIG. 3-4, landing gear assembly 18 may include a plurality of wheeled legs 56 arranged in a tricycle configuration. The tricycle configuration may provide stability to airship 10 during ground operations, as well as during landings and takeoffs. In an exemplary embodiment, legs 56 may not be retractable into hull 12, which may reduce a weight and complexity of landing gear assembly 18.

Figure 9:
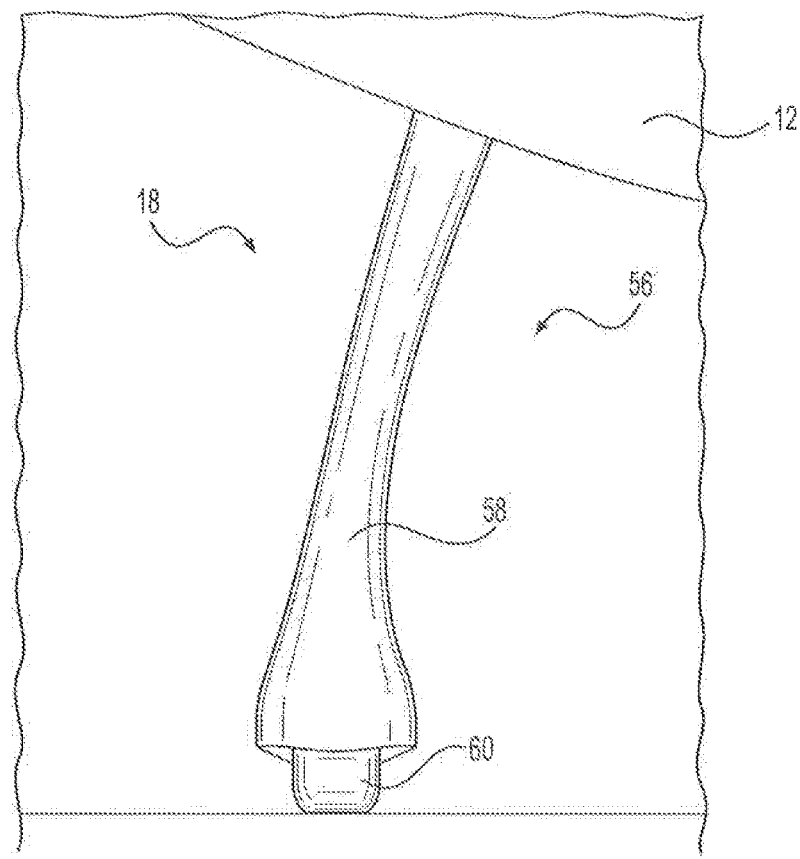
FIGS. 9-10 illustrate an exemplary landing gear assembly, consistent with disclosed embodiments.

FIGS. 9-10 further depict a leg 56 of landing gear assembly 18. Leg 56 may include a stanchion member 58 and a wheel 60. In order to reduce drag caused by the landing gear assembly 18 during flight, stanchion member 58 may be sheathed in lightweight aerodynamic fairings. Wheel 60 may include a tire, which may be a specially-adapted tire for use in certain environments (e.g., tundra, desert, mountains, etc.).

In some embodiments, landing gear assembly 18 may be configured for use in mooring a grounded airship 10. For example, landing gear assembly 18 may be of sufficient strength to allow a mooring mechanism (e.g., a wire) to be secured between landing gear assembly 18 and the ground, helping to maintain airship 10 in one location and overcoming forces (e.g., wind forces) that may tend to force airship 10 away from its moored location.

In some embodiments, landing gear assembly 18 may include features the help facilitate cargo exchange. For example, landing gear assembly 18 may be configured to change in length with respect to hull 12 (e.g., retract into hull 12, telescope into itself, etc.) such that gondola 20 may be lowered toward the ground, assisting with a cargo delivery/pickup/exchange process. In another example, wheels 60 may be configured to allow rolling movement in any direction, such as to allow a position of airship 10 to be adjusted on the ground in any direction, assisting with cargo exchange and or mooring of airship 10.

Gondola

Figure 11:
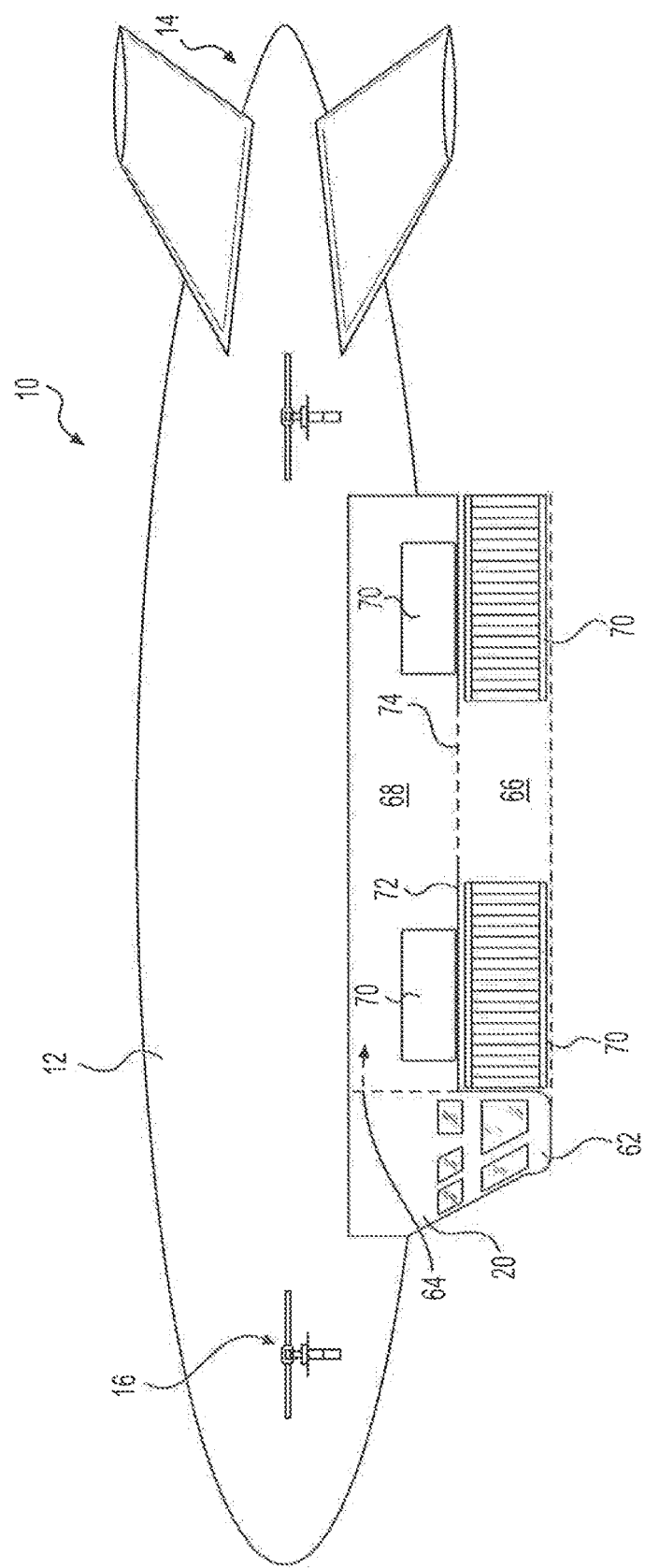
FIG. 11 illustrates the cargo airship of FIG. 1, including a sectional view of an exemplary gondola, consistent with disclosed embodiments.

FIG. 11 further depicts gondola 20 of airship 10. In an exemplary embodiment, gondola 20 may be affixed to a lower portion of airship 10 and include a cockpit 62 and a cargo bay 64. Cargo bay 64 may include an external cargo area 66 and an internal cargo area 68. Gondola 20 may be attached to support structure 26.

In one embodiment, one or more support beams may span at least a portion of airship 10, such as a distance from a perimeter of hull 14 to gondola 20. The support beams may provide additional strength and rigidity to hull 12, as well as permit a load capacity that provides for a wide variety of uses for airship 10, including the safe transportation of heavy cargo. It should be understood, however, that gondola 20 may be connected to and supported by hull 12 in other manners.

Figure 12:
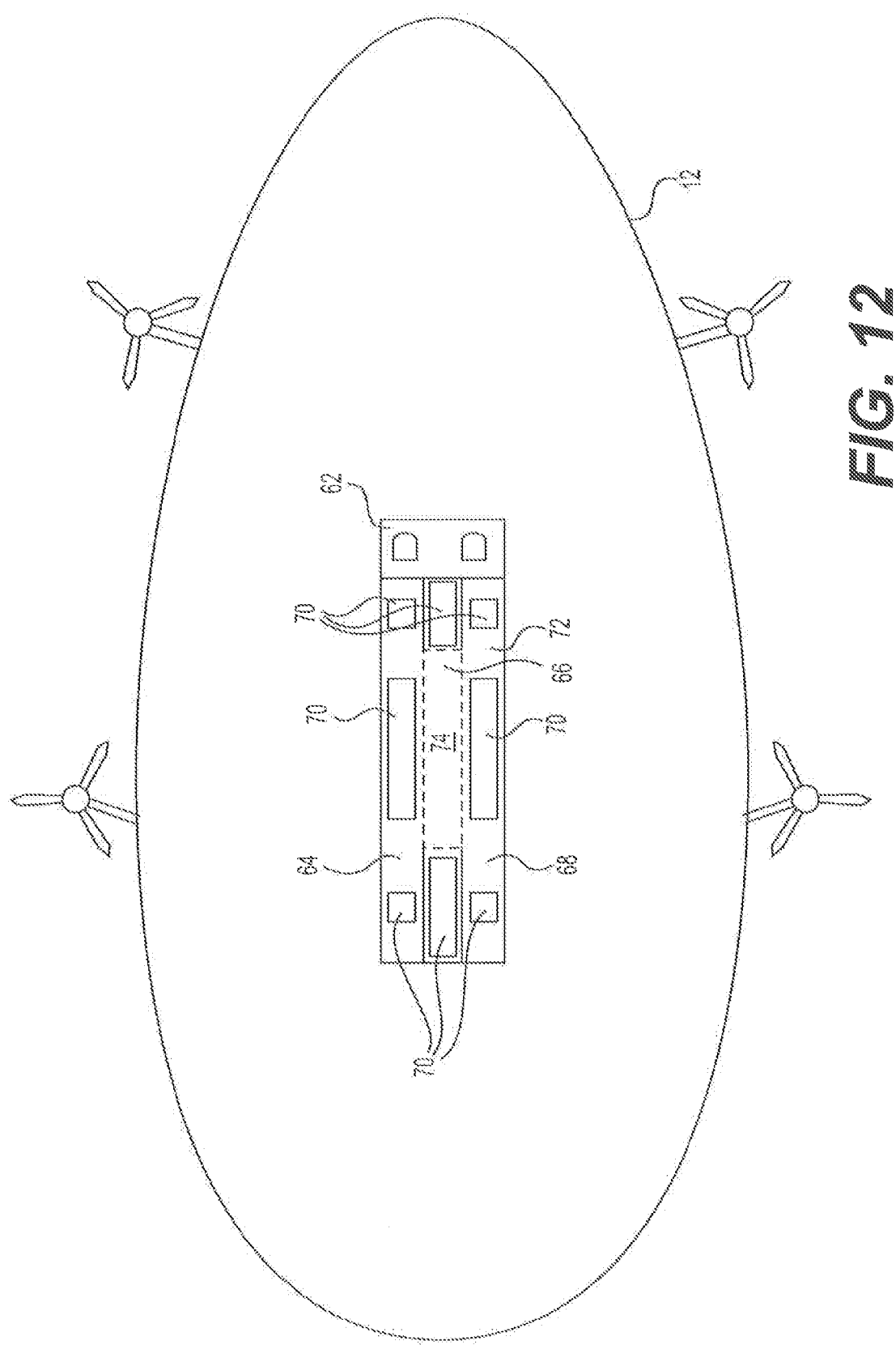
FIG. 12 illustrates a sectional top-view of an airship, including the gondola of FIG. 11, consistent with disclosed embodiments.

FIG. 12 further illustrates gondola 20, including an exemplary position of gondola 20 with respect to hull 12. In one embodiment, gondola 20 may be positioned near a center of hull 12, with cockpit 62 facing the nose of airship 10 and cargo bay 64 positioned behind cockpit 62. Gondola 20 may be approximately one third of an overall length of hull 12. Cockpit 62 may be positioned to provide good forward and side vision for flight crew, while also affording a good view aft, toward cargo bay 64.

Gondola 20 may include a portion that may serve as a keel to which various cargo 70 may be attached. For example, gondola 20 may include a flat horizontal wall 72 separating external cargo area 66 from internal cargo area 68. Horizontal wall 72 may serve as a ceiling of external cargo area 66 and a floor of internal cargo area 68. An opening 74 in horizontal wall 72 may connect external cargo area 66 with internal cargo area 68. Cargo 70 may be lifted through opening 74 and secured to horizontal wall 72 (or elsewhere in internal cargo area 68). A door (not shown) may close opening 74. Cargo handling system 22 (FIGS. 16-21) may be configured to move cargo to and from the ground below, as well as around cargo bay 64, as will be described in more detail below.

Figure 14:
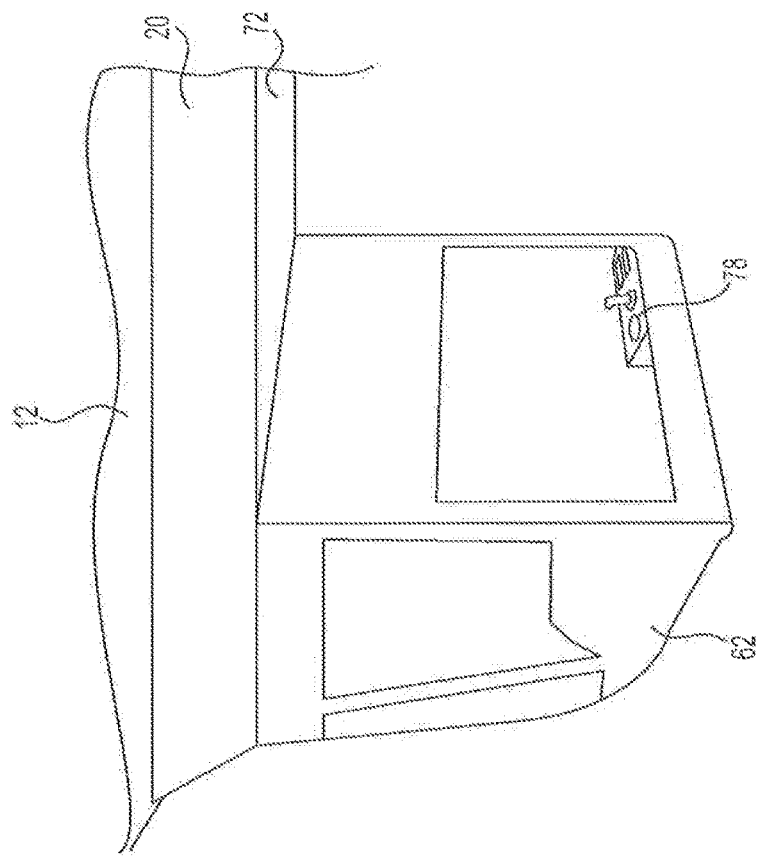
FIG. 14 illustrates a rear portion of the cockpit of FIG. 13, consistent with disclosed embodiments.
Figure 13:
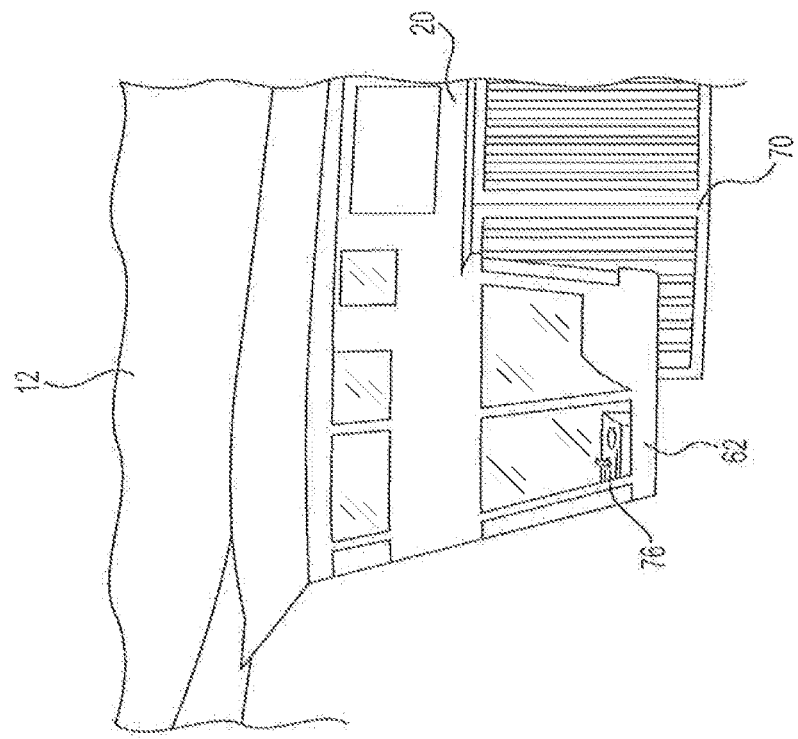
FIG. 13 illustrates a front portion of an exemplary cockpit, consistent with disclosed embodiments.
Figure 15:
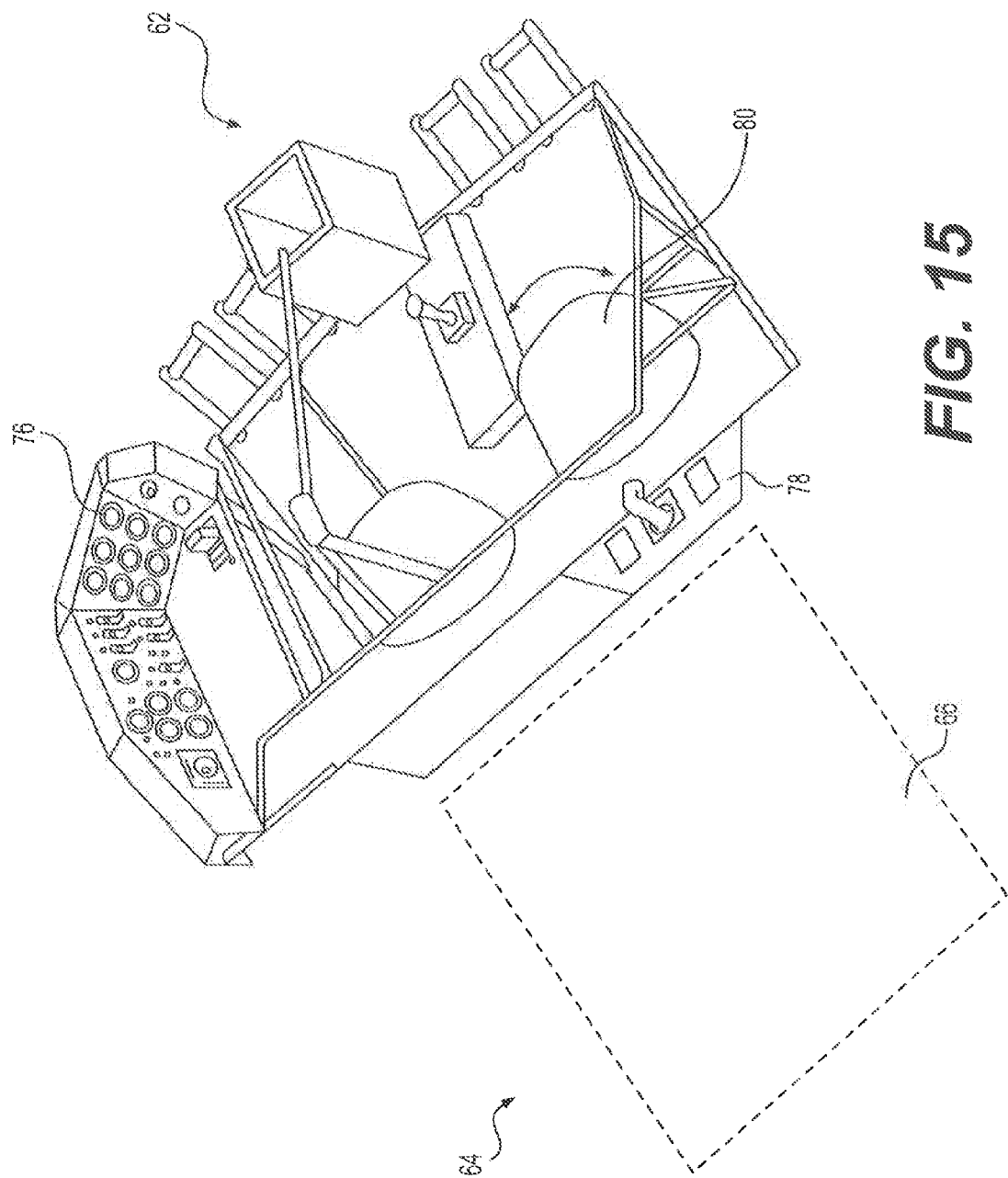
FIG. 15 illustrates an interior of the cockpit of FIG. 13, consistent with disclosed embodiments.

FIGS. 13-15 further depict cockpit 62, which may include at least one control station for controlling flight and cargo handling operations of airship 10. As shown in FIG. 13, cockpit 62 may be positioned at a front end of gondola 20 and include one or more windows facing toward an area in front of airship 10. A flight control station 76 may be positioned inside cockpit 62 such that an operator (e.g., pilot, co-pilot, etc.) may look out the front-facing windows while flying airship 10. As shown in FIG. 14, cockpit 62 may also include one or more windows facing rearwards toward a tail of airship 10. A cargo handling control station 78 may be positioned inside cockpit 62 such that an operator (e.g., pilot, co-pilot, load master, crew member, etc.) may see at least external cargo area 66 while controlling cargo handling system 22.

FIG. 15 further depicts cockpit 62, including flight control station 76 and cargo handling control station 78. Flight control station 76 may include controls for an operator (e.g., a pilot and/or crew) to control one or more aspects of airship 10 related to flight (e.g., fin assembly 14, propulsion system 16, one or more features associated with gas cells 38 (e.g., valves), etc. For example, flight control station 76 may include controls for propulsion system 16 such that a pilot may maneuver airship 10 through a flight operation, including, for example, takeoff, flight to location, hovering and/or landing, etc.

Cargo handling control station 78 may include controls that allow an operator to control at least one aspect of cargo handling system 22. For example, cargo handling control station 78 may include controls that allow an operator to perform one or more cargo handling operations, such as lowering a crane towards the ground, lifting the crane towards cargo bay 64, opening and/or closing one or more cargo locks to secure cargo 70 to horizontal wall 72, and the like. In one embodiment, cockpit 62 may include at least one seat 80 for an operator (e.g., a co-pilot) which may swivel between flight control station 76 and cargo handling control station 78. In this way, an operator may assist with a flying operation at one time, and then easily switch to control a cargo handling operation. For example, a co-pilot may assist a pilot with reaching a destination, and then, once the destination is reached, perform a cargo handling operation (e.g., exchange of cargo), such as while the pilot maintains the airship in a hover above a delivery location.

Cargo Handling System

FIGS. 16-21 depict various exemplary features of cargo handling system 22. In an exemplary embodiment, cargo handling system 22 may include at least one hoisting mechanism 82 configured to lift cargo 70 from the ground to cargo bay 64 and lower cargo 70 from cargo bay 64 to the ground. As used herein, cargo 70 may be considered on the ground if it is at least partially supported by the ground, including cargo that is stacked, supported by a truck, etc. Cargo handling system 22 may allow for quick and efficient delivery and/or exchange of cargo 70.

Figure 16:
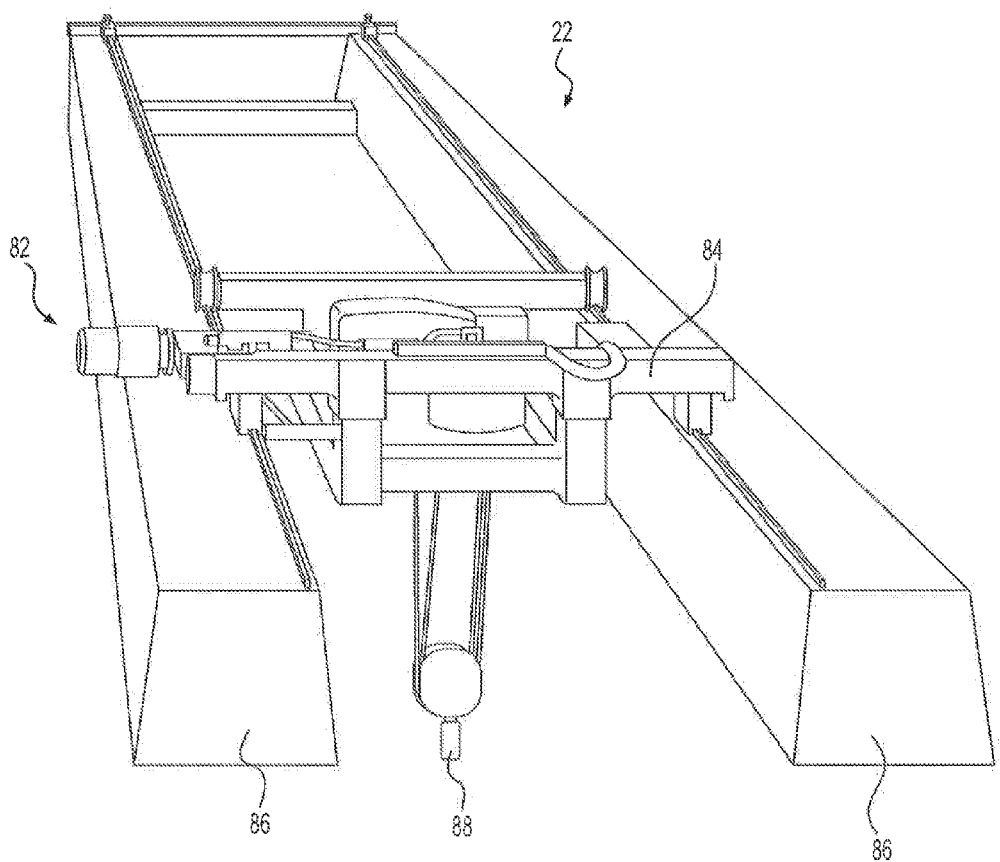
FIG. 16 illustrates an exemplary two-rail crane that may be used in conjunction with a cargo handling system, consistent with disclosed embodiments.
Figure 17:
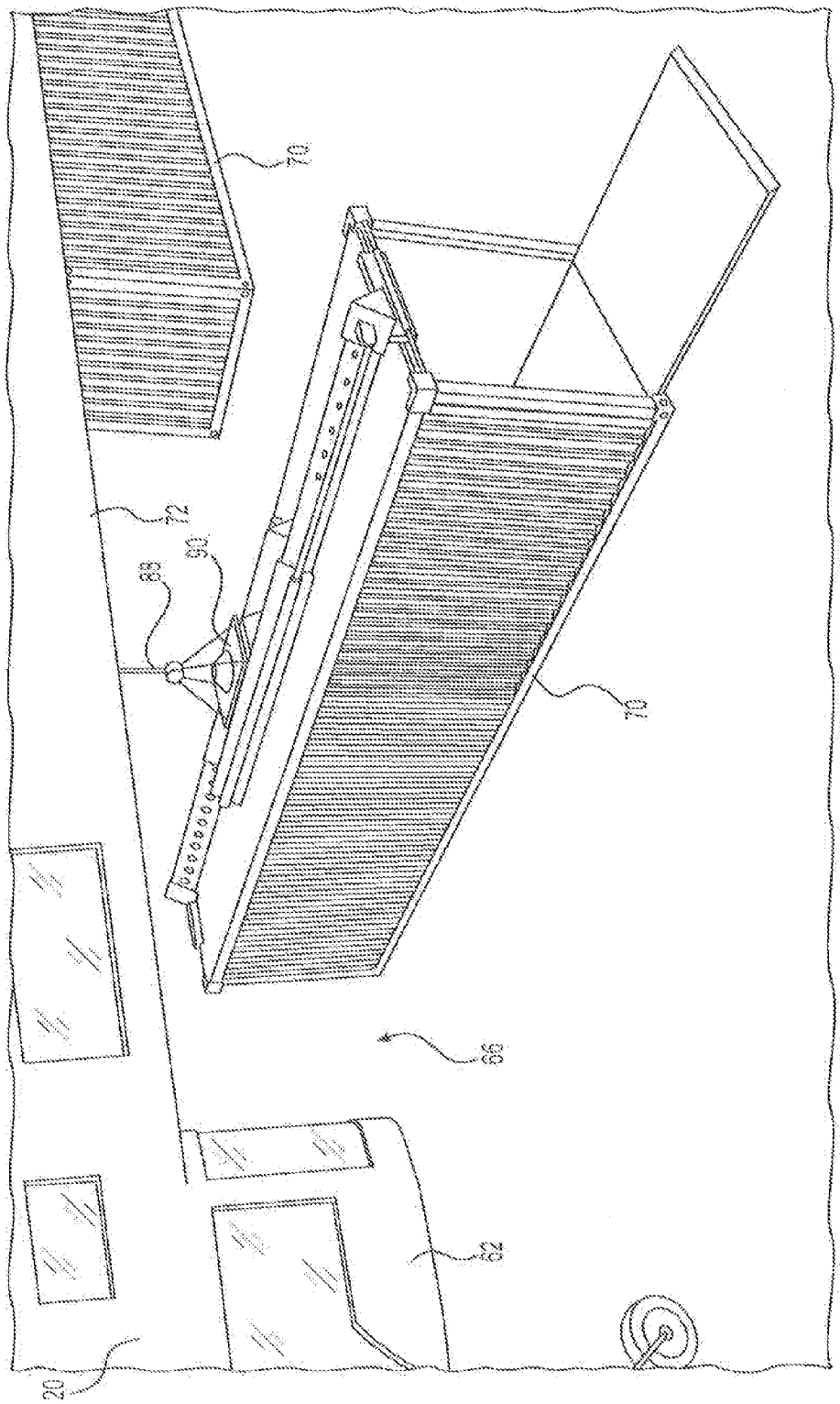
FIG. 17 illustrates a cargo handling system connected to cargo, consistent with disclosed embodiments.

FIG. 16 depicts an exemplary hoisting mechanism 82 that may be used in conjunction with cargo handling system 22. In one embodiment, hoisting mechanism 82 may include a two-rail crane 84. Two-rail crane 84 may include a pair of rails 86 and a hoist 88 configured to move longitudinally along rails 86 (e.g., via an electric motor), thereby allowing a position of hoist 88 to be adjusted. Hoist 88 may include a mechanism configured to lower and raise a cargo attachment member 90. Two-rail crane 84 may be controllable via cargo handling control station 78. FIG. 17 further depicts cargo handling system 22, including hoisting mechanism 82 connected to cargo 70 on the ground.

Figure 18:
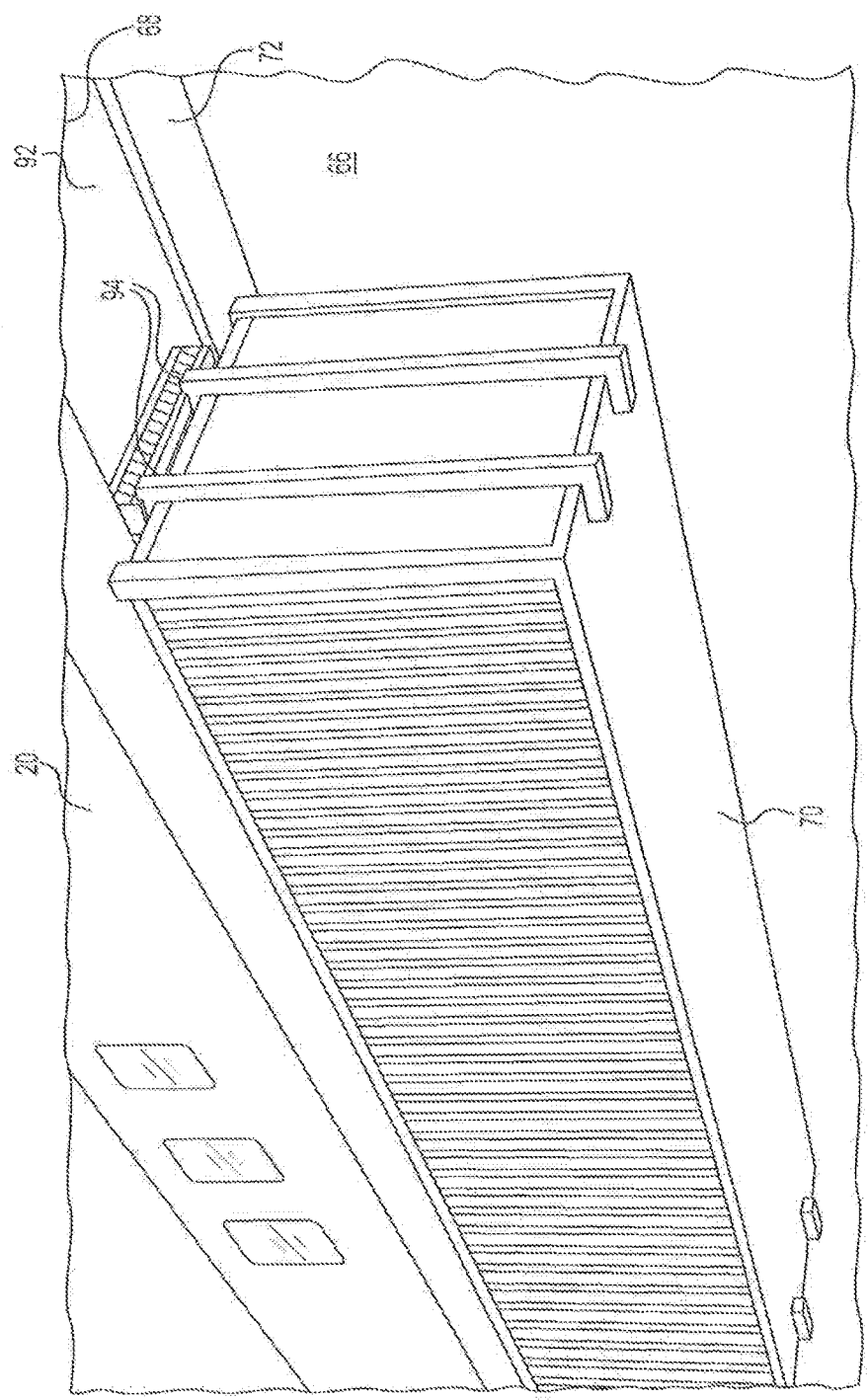
FIG. 18 illustrates the cargo of FIG. 17 secured in a cargo bay of an airship, consistent with disclosed embodiments.

FIG. 18 depicts cargo bay 64, including a tunnel 92 formed in horizontal wall 72. In an exemplary embodiment, two hoists 88 may be positioned in tunnel 92. For example, one hoist 88 may be configured to move on a horizontal track above a second hoist 88 to allow either hoist 88 to move forward or aft as necessary to raise or lower cargo 70. Hoists 88 may include heavy-duty winches and container handling equipment adapted to move cargo 70.

In an exemplary embodiment, hoists 88 may be configured to be secured to various types of cargo 70. For example, hoists 88 may be configured to be attached to standard-size shipping containers (e.g., 20-foot or 40-foot shipping containers). In addition, hoists 88 may be configured to be attached to other cargo, such as bags for liquid (e.g., fuel, etc.) and loose solids (gravel, ore, etc.). In some embodiments, hoists 88 may be configured to accommodate cargo nets, allowing many other forms of cargo (e.g., odd-shaped individual items, boxes, barrels, pallets, etc.).

Figure 19:
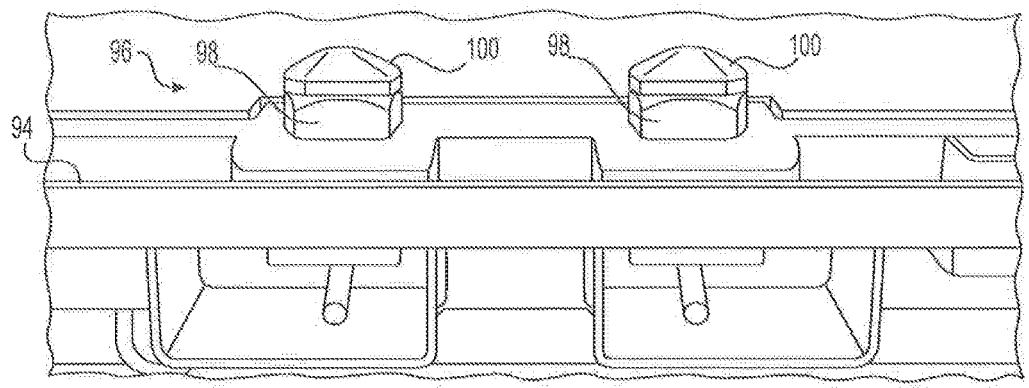
FIGS. 19-21 illustrate an exemplary locking mechanism configured to be used in conjunction with the cargo handling system of FIG. 17, consistent with disclosed embodiments.
Figure 20:
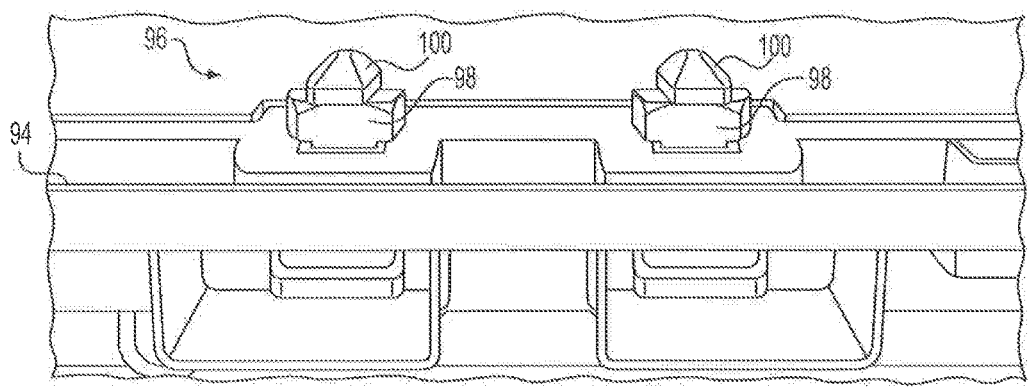
Figure 21:
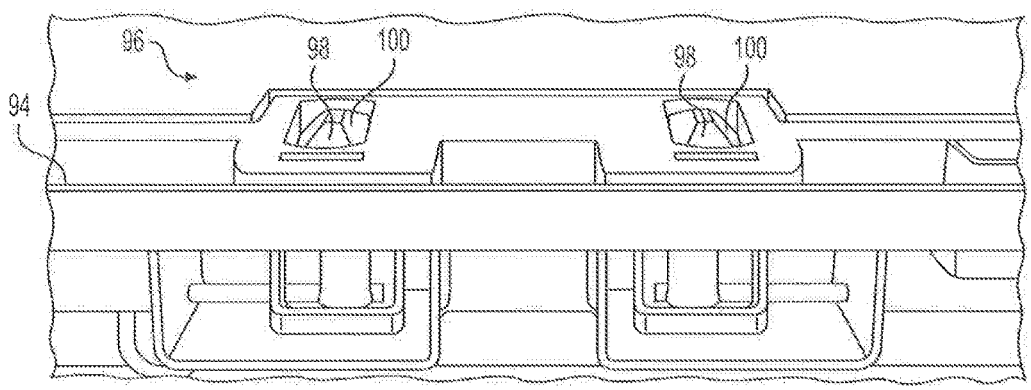

As shown in FIG. 18, hoisting mechanism 82 may be configured to lift cargo 70 and position cargo 70 snug against horizontal wall 72. In this way, at least some cargo 70 may be held in external cargo area 66. FIGS. 19-21 depict an exemplary locking mechanism 94 that may be used to secure cargo 70 in external cargo area 66. In one embodiment, locking mechanism 94 may include a twist-lock device 96.

As shown in FIG. 19, twist-lock device 96 may include a projection 98 configured to project from cargo 70 or horizontal wall 72 and be inserted in a recess (not shown) in the other of cargo 70 or horizontal wall 72. As shown in FIG. 20, a rotatable member 100 may be a portion of projection 98 and configured to rotate, thereby preventing rotatable member 100 from being removed from the recess. Projection 98 may be retracted when not in use, as shown in FIG. 21.

In some embodiments, at least one hoist 88 of hoisting mechanism 82 may be configured to lift other cargo 70 through opening 74 in horizontal wall 72, and place cargo 70 at a desired location inside internal cargo area 68 (e.g., on horizontal wall 72, suspended from support structure 26, etc.). FIG. 12 depicts various cargo 70 within internal cargo area 68, which may be positioned for convenience of delivery and/or to evenly distribute weight across airship 10.

Flight Control System

Figure 22:
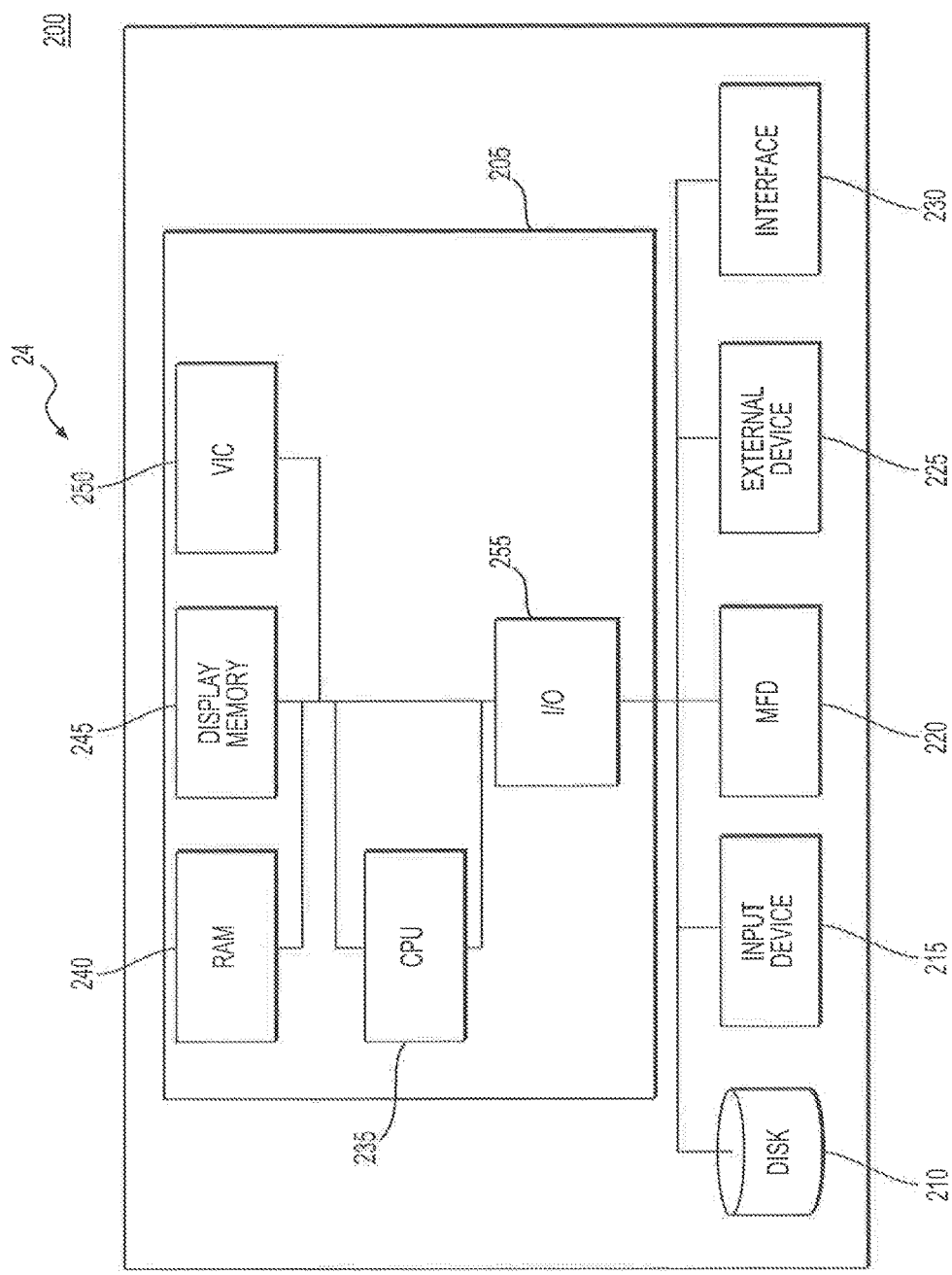
FIG. 22 is a block diagram of an exemplary flight control system computer, consistent with disclosed embodiments.

Whether configured for manned, un-manned, and/or automated flight, airship 10 may, according to some embodiments, be controlled by a computer 200. For example, stabilizing fins 44 and propulsion assemblies 46, among other things, may be controlled by a computer 200. FIG. 22 is a block diagram of an exemplary embodiment of a computer 200 consistent with the present disclosure. For example, as shown in FIG. 22, computer 200 may include a processor 205, a disk 210, an input device 215, a multi-function display (MFD) 220, an optional external device 225, and interface 230. Computer 200 may include more or fewer components as desired. In this exemplary embodiment, processor 205 includes a CPU 235, which is connected to a random access memory (RAM) unit 240, a display memory unit 245, a video interface controller (VIC) unit 250, and an input/output (I/O) unit 255. The processor may also include other components.

In this exemplary embodiment, disk 210, input device 215, MFD 220, optional external device 225, and interface 230 are connected to processor 205 via I/O unit 255. Further, disk 210 may contain a portion of information that may be processed by processor 205 and displayed on MFD 220. Input device 215 includes the mechanism by which a user and/or system associated with airship 10 may access computer 200. Optional external device 225 may allow computer 200 to manipulate other devices via control signals. For example, a fly-by-wire or fly-by-light system may be included allowing control signals to be sent to optional external devices, including, for example, servo motors associated with propulsion unit mounts 52 and stabilizing fins 44. "Control signals," as used herein, may mean any analog, digital, and/or signals in other formats configured to cause operation of an element related to control of airship 10 (e.g., a signal configured to cause operation of one or more control surfaces associated with airship 10). "Fly-by-wire," as used herein, means a control system wherein control signals may be passed in electronic form over an electrically conductive material (e.g., copper wire). Such a system may include a computer 200 between the operator controls and the final control actuator or surface, which may modify the inputs of the operator in accordance with predefined software programs. "Fly-by-light," as used herein, means a control system where control signals are transmitted similarly to fly-by-wire (i.e., including a computer 200), but wherein the control signals may transmitted via light over a light conducting material (e.g., fiber optics).

According to some embodiments, interface 230 may allow computer 200 to send and/or receive information other than by input device 215. For example, computer 200 may receive signals indicative of control information from flight controls 220, a remote control, and/or any other suitable device. Computer 200 may then process such commands and transmit appropriate control signals accordingly to various systems associated with airship 10 (e.g., fin assembly 14, propulsion system 16, etc.). Computer 200 may also receive weather and/or ambient condition information from sensors associated with airship 10 (e.g., altimeters, navigation radios, pitot tubes, etc.) and utilize such information for generating control signals associated with operating airship 10 (e.g., signals related to trim, yaw, and/or other adjustments).

In an exemplary embodiment, computer 200 may receive pilot control signals from flight control station 76, interpret the control signals, and produce a control signal to cause one or more features of airship 10 to respond in a manner intended by the pilot. In this way, a pilot may perform flight operations associated with airship 10. For example, a pilot may fly airship from one location to another to deliver, pickup, and/or exchange cargo 70.

Figure 23:
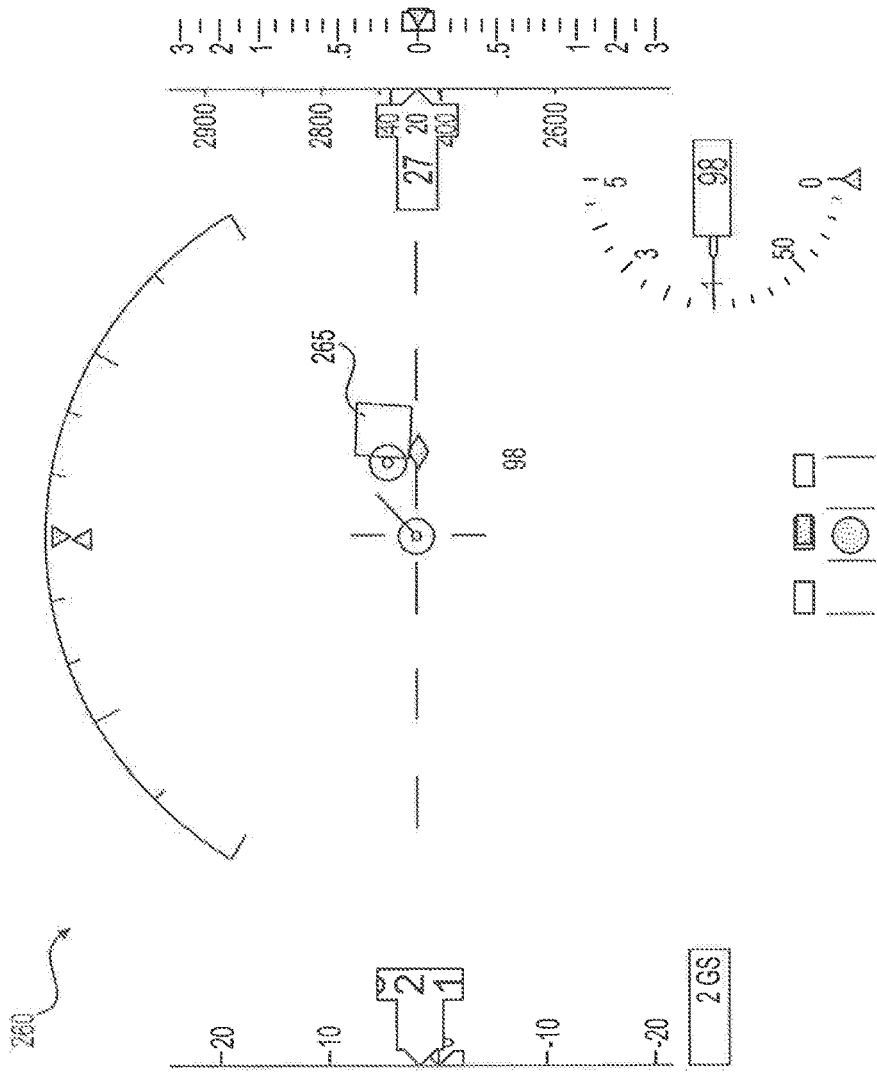
FIG. 23 illustrates an exemplary flight display, consistent with disclosed embodiments.

FIG. 23 depicts an exemplary display 260, which may be used in conjunction with flight control system 24 to allow a pilot to perform a flight operation, such as a hover operation. Display 260 may provide a user (e.g., a pilot) with a combination of a forward view and a downward vertical view of conditions around airship 10. In this way, the pilot may control both a vertical and horizontal positioning of airship 10 during a hover. In one embodiment, display 260 may include a representation 265 of a hover pad, such that display 260 indicates a position and an acceleration of airship 10 relative to a hover pad below, further assisting the pilot with maintaining a three-dimensional position during a hover operation. In some embodiments, computer 200 may assist the pilot with flight operations.

For example, it may be desirable for computer 200 to transmit in-flight signals configured to, for example, correct course heading and/or assist in stabilizing airship 10 independent of an operator of airship 10. For example, computer 200 may calculate, based on inputs from various sensors (e.g., altimeter, pitot tubes, anemometers, etc.), a wind speed and direction associated with ambient conditions surrounding airship 10. Based on such information, computer 200 may determine a set of operational parameters that may maintain stability of airship 10. In an exemplary embodiment, computer 200 may provide automated control that includes surge and heave control for maintaining the airship in the hovering state.

In an exemplary embodiment, flight control system 24 may further include various features that allow for the planning of a future flight operation. For example, computer 200 may be configured to estimate environmental factors associated with a cargo transfer location during a future time period associated with a flight mission. Computer 200 may be configured determine an effect of these estimated environmental factors on flight parameters of airship 10. For example, computer 200 may be configured to estimate an effect on aerostatic lift and airship stability.

In some embodiments, computer 200 may be configured to determine a route map for the flight mission, such as a flight mission for delivering and/or picking up cargo 70. Computer 200 may consider any determined effect of estimated environmental factors when determining the route map, including determining a particular time frame that may be best suited for the flight mission. Further, an anticipated cargo transfer mode, such as whether the flight mission will include a landed exchange or a hovering exchange, may be considered by computer 200 when determining a route map with time frame. Computer 200 may be configured to display a determined route map on a display associated with airship 10.

In some embodiments, airship 10 may be configured to consider environmental factors at a destination location (e.g., a delivery site) when determining a route map for a flight mission. In order to consider the environmental factors, flight control system 24 may include at least one weather detection device configured to transmit environmental condition data to computer 200. In one embodiment, the weather detection device may be permanently installed at a particular destination location (e.g., a delivery site at which regular deliveries are made). In another embodiment, the weather detection device may be portable and may be configured to be transported by the airship. In this way, one or more weather detection devices may be sent to a delivery site ahead of a planned flight mission and set-up for detection of environmental factors. Computer 200 may use the detected environmental factors in planning a route map, and may be used by the pilot in executing a flight mission. After a delivery is completed, the one or more weather detection devices may be secured as cargo to airship 10 and transported back their previous location.

Mooring/Tethering System

Figure 24:
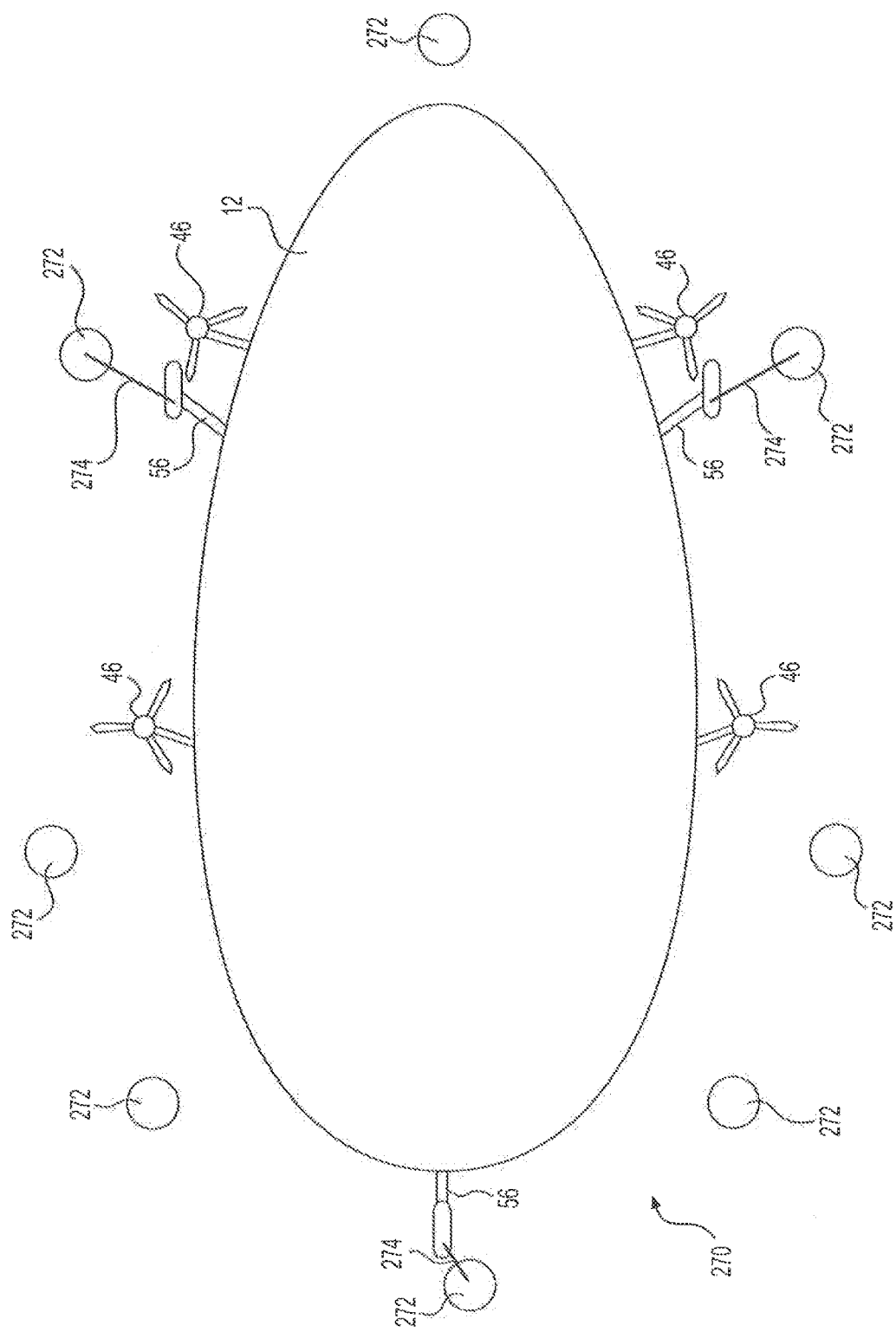
FIG. 24 illustrates a top-view of an airship and a mooring configuration, consistent with disclosed embodiments.

When airships, such as airship 10, are on the ground, it may be difficult to maintain a stationary location. The lifting force provided by the gas in gas cells 38 and wind forces exerted on hull 12 may tend to move airship 10 as it sits on the ground. In order to help keep airship 10 in one location, a mooring system 270 may be used. FIG. 24 depicts a top view of airship 10 located on the ground G. A plurality of mooring pads 272 may be arranged on a suitable ground surface. Mooring pads 272 may be concrete pads formed flush with the ground G.

In one embodiment, each of the three legs 56 of landing gear assembly 18 may include a securing winch. A securing cable 274 may run from the each winch to a mooring pad 272. Mooring pads 272 may include steel rings to which securing cables 274 may be attached. A crew member, such as the pilot, may operate the winches to tighten securing cables 274. In an exemplary embodiment, mooring pads 272 may be arranged such that, when securing cables 274 are tightened, legs 56 are located directly over a mooring pad 272, thereby holding airship 10 tightly in place.

In another embodiment, mooring system 270 may include a mechanism by which front landing gear leg 56 of landing gear assembly 18 may be moored to a hard point (e.g., on a flying field). The front landing gear leg 56 would thereby serve as the point about which airship 10 would move horizontally during wind directional changes.

Figure 26:
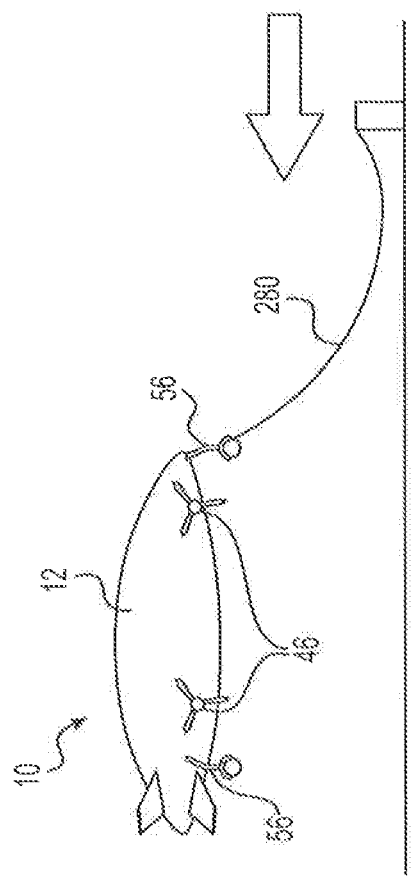
FIGS. 25-26 illustrate an airship during a hovering operation, including a tether cable, consistent with disclosed embodiments.
Figure 25:
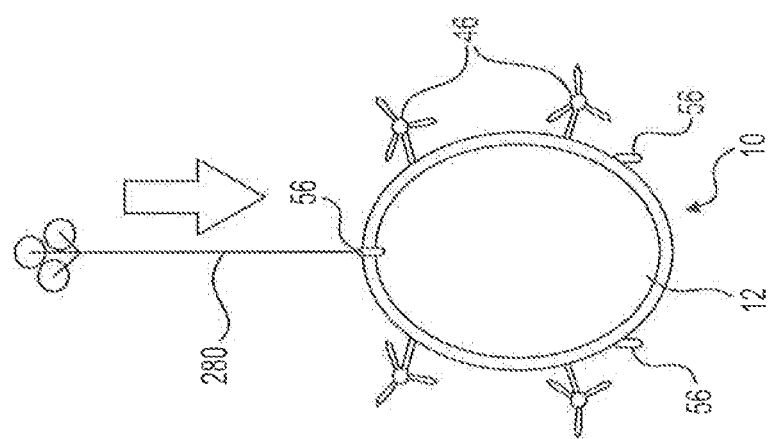

There are other situations and configurations by which airship 10 may be moored to ground G. For example, when cargo transfers are conducted while hovering in strong wind conditions, it may be necessary to provide some assistance in maintaining airship 10 in a relatively stationary location. FIGS. 25-26 illustrate one exemplary assistance mechanism in the form of a tether cable 280. Tether cable 280 may be secured to airship 10 (e.g., the front landing gear of landing gear assembly 18) and a hard point on the ground (e.g., a mooring pad 272), approximately one length L in front of the ship, for example. Tether cable 280, which may be attached to a swivel mount in the ground, helps to hold airship 10 against strong steady winds or strong wind gusts, obviating the need for rapid re-vectoring of propulsion assemblies 46 or making sudden changes in output power. Tether cable 280 also tends to bring airship 10 back to a stable position directly downwind from the cable anchor point, enhancing the horizontal positional stability of airship 10.

As wind gusts increase and decrease, airship 10 may experience a "blow down" effect by which the airship 10 is forced downward in altitude. But because tether cable 280 may be secured to a loading portion of airship 10 (e.g., landing gear assembly 18), tether cable 280 may act as a stabilizing restraint against any pitching motion caused by wind gusts. For example, tether cable 280 acts as a general damper against movement in three dimensions. The dampening provides additional time for the pilot to control propulsion system 16 to counter the influences of the wind.

INDUSTRIAL APPLICABILITY

The airship of the present disclosure may be adapted for use in any of a variety of operations while providing various advantages over other options. In one aspect, an airship of the present disclosure may be adapted for the transport of cargo, especially heavy cargo to be delivered to or picked up from a location that would otherwise be difficult to reach. Examples of such remote locations may include a tundra region, an arctic region, or a desert region.

In one example, an airship consistent with disclosed embodiments may be useful in reaching remote mining locations, pipelines in the arctic, impoverished areas in need of food and water, and other areas that are not otherwise easily accessed via ground vehicle or airplane and/or could not easily receive shipments of heavy cargo.

In another example, an airship of the present disclosure may be used to provide a large facility on-demand, wherever and whenever needed. For instance, an airship may be equipped as a mobile medical facility that may travel to an area of need (e.g., a location of a disease outbreak) and be large enough to provide shelter and services to many people, obviating the need to build a stationary facility.

Airship 10 of the present disclosure includes various features that enable safe and efficient delivery, pickup, and/or exchange of cargo 70. For example, the size and weight capacity of airship 10 allows for one-stop delivery and/or pickup of numerous and/or heavy cargo. Further, the specially-designed and tested shape of hull 12, the arrangement of fin assembly 14, and the configuration of propulsion system 10 allows airship 10, despite its size, to easily perform a variety of flight operations and maneuvers, including a hover operation in which airship 10 is controlled to remain in a relatively steady three-dimensional location while a cargo transfer takes place below.

Further, the arrangement and configuration of gondola 20 and cargo handling system 22 allow for a quick and efficient cargo transfer, such as during a hover operation. For example, cockpit 62, equipped with easily-accessed cargo handling control station 78, may allow a crew member (e.g., a co-pilot) to quickly switch from a flight operation to a cargo handling operation, simply by looking out a window facing cargo bay 64. The crew member may operate controls to manipulate one or more features of cargo handling operation, working with other crew members (e.g., crew on the ground) to perform a cargo transfer.

Further, the availability of external cargo area 66 allows for quick lowering and/or lifting of cargo 70 to execute a transfer. In addition, external cargo area 66 allows for transport of standardized cargo, such as 20- or 40-foot shipping containers that are normally transported on ships or land-based vehicles. In one embodiment, external cargo area 66 may be sized to accommodate three 20-foot shipping containers. In another embodiment, airship 10 may be sized and arranged such that external cargo area 66 may accommodate six 40-foot shipping containers.

Figure 27:
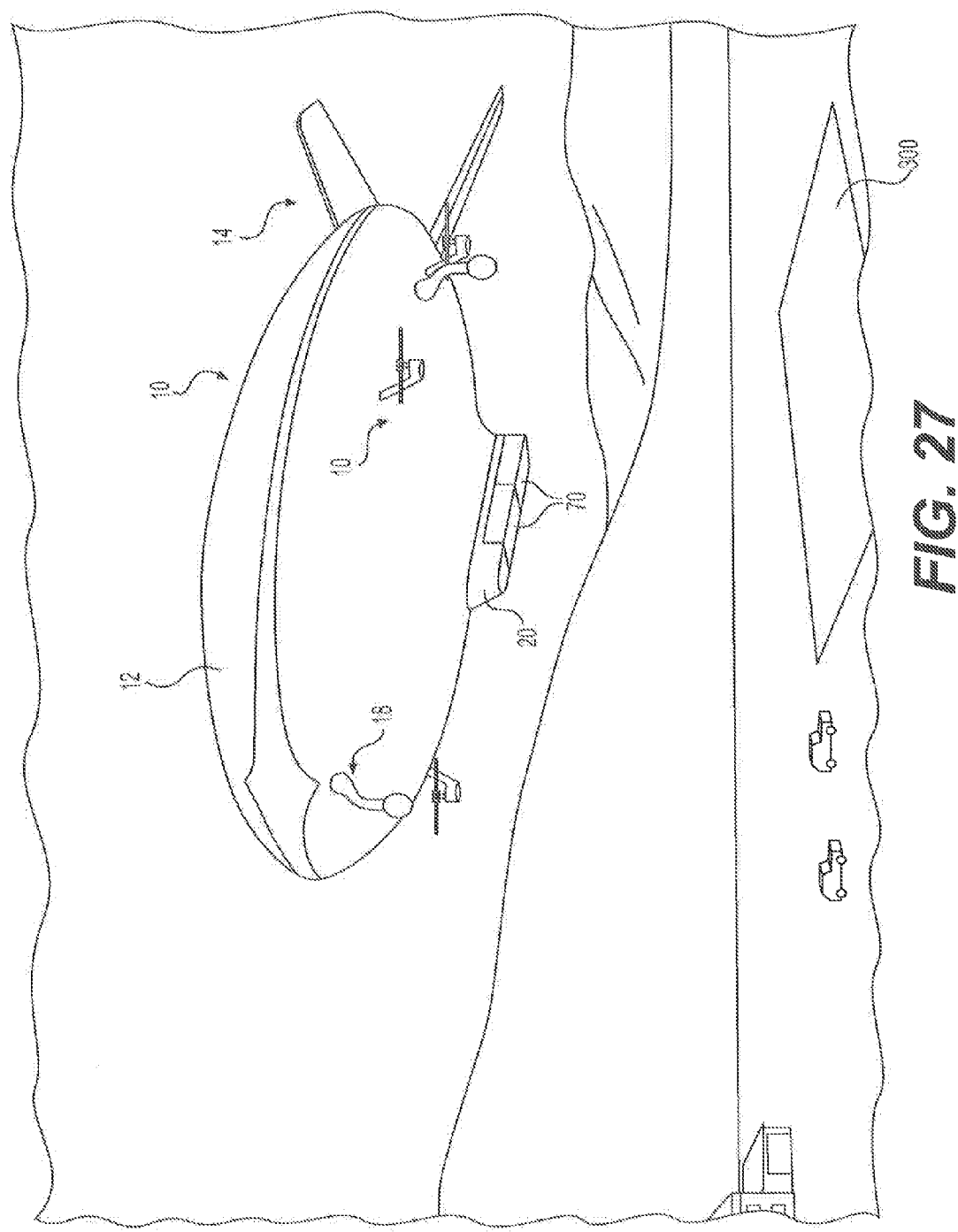
FIG. 27 illustrates an airship during a flight operation, consistent with disclosed embodiments.

FIG. 27 depicts airship 10 during an exemplary flight operation. For example, airship 10 may be preparing for a cargo delivery operation at destination site 300. Flight control system 24 and a flight crew may operate airship 10 to takeoff from an origination location (e.g., a location where cargo 70 is picked up for delivery) and travel to destination site 300, taking into account various factors such as environmental factors and a cargo transfer mode. These considerations allow airship 10 to adapt to various flight missions, such that airship 10 may be used to exchange cargo in a variety of different situations. These situations may include landed load exchanges and hovering load exchanges. Further, these situations may include cargo transfer at locations that are specially equipped for such operations (e.g., sites that are well-prepared for a delivery/pickup/exchange, such as sites that are regularly visited by airship 10) and cargo transfer at locations that are not adapted for a cargo transfer (e.g., sites that are not regularly visited by airship 10 and/or have no infrastructure in place for assisting the operation).

An exemplary cargo transport operation will now be described. Airship 10 may be moored overnight at an origination location. On-board sensors may communicate with computer 200 to monitor essential airship systems. For example, computer 200 may monitor gas pressure and purity in gas cells 38, superheat percentage of gas, overall heaviness and/or lightness of airship 10, temperature of power sources 48, fuel tanks, and fuel lines. Flight control system 24 may include monitoring systems configured to send messages to "on call" personnel to inform them of any issues that may occur while airship 10 is moored.

At the beginning of a flight operation, flight control system 24 may communicate with on-board instrumentation to determine a static heaviness (or lightness) of airship 10. This information may be important for maintaining a predetermined heaviness that allows for efficient and safe flight of airship 10. Crew of airship 10 may use an airship environmental planning tool to further prepare for the flight. For example, the crew may review a route map generated by flight control system 24, including a predictive assessment of conditions at a destination site (e.g., based on weather detection devices that are located at the destination site). The route map may provide an optimum heading, speed, and altitude that will minimize an impact of local weather on each leg of an airship flight operation.

In addition, planning for the flight operation may include analysis of cargo to be delivered and/or picked up at the destination site 300. In particular, because airship 10 may need to be loaded to a certain level to allow for safe flight, ballast determinations may be made to determine what will make up for absence of cargo (e.g., prior to pick-up or after delivery). Ballast may include concrete blocks, for example, that are secured in cargo bay 64 (e.g., held in external cargo area 66). Alternatively, ballast may be attached to an external hook installed on cockpit 62 nearest forward landing gear of landing gear assembly 18. This arrangement would leave cargo bay 64 and hoisting mechanism 82 open and available for attaching any cargo 70 for delivery.

If there is cargo 70 for delivery, a member of the crew may operate cargo handling system 22 to secure cargo 70 in cargo bay 64. For example, an operator may lower one or more hoists 88 of hoisting mechanism 82 to the ground to allow an attachment member 90 to be secured to cargo 70. Thereafter, hoist 88 may be lifted with cargo 70, placing it in a desired location within cargo bay 64. For example, cargo 70 may be lifted up into external cargo area 66, contacting horizontal wall 72. An operator may remotely control locking mechanism 94 to secure cargo 70 to horizontal wall 72.

After various flight checks are made, the flight crew (e.g., pilot and co-pilot) may prepare for and execute a takeoff operation. The takeoff operation may be a vertical takeoff or a running takeoff, depending on the parameters of airship 10 at the time and the available infrastructure at the origination site (e.g., presence of a runway). The flight crew may control propulsion system 16 to modify a thrust vector associated with propulsion assemblies 46, thereby causing airship 10 to fly away from the origination site on the planned route.

As airship 10 approaches destination site 300, the crew may prepare for a cargo transfer operation. As described herein, the cargo transfer operation may be a hovering load exchange or a landed load exchange. In some embodiments, flight control system 24 may continuously receive environmental condition data and provide the information to the flight crew for consideration during flight and approach to destination site 300. In addition, the computer 200 may consider a heaviness of airship 10 and determine whether ballast or trim adjustments are necessary. The flight crew and flight control system 24 may work together to bring airship 10 to a location above destination site 300, such as a location approximately equal to the length L of airship 10 above destination site 300.

From this position, a crew member sits in seat 80 and turns to face cargo bay 64. This crew member may operate cargo handling control station 78 to assist with the cargo transfer. Meanwhile, another crew member may operate flight control station 76 to maintain airship 10 within an acceptable degree of deviation from the location above destination site 300.

The crew member may operate cargo handling control station 78 to manipulate cargo handling system 22 to perform a cargo transfer. In one example, a first hoist 88 may be connected to cargo to be lowered to the ground ("delivery cargo") and a second hoist 88 may be unattached to any cargo. The second hoist 88 may be lowered to the ground and connected to cargo or ballast being picked-up ("return cargo"). The crew member operating cargo handling system 22 may begin to lower the delivery cargo to the ground. Once connected, the hoist tension of the second hoist 88 is increased on the return cargo to approximately 50% of the weight of the delivery cargo. The tension on the return cargo is increased while the tension on the delivery cargo is slackened to 50% weight. The operating crew member then quickly increases tension on the return cargo to 100% and reduces tension on the delivery cargo to 0%. The return cargo is the hoisted up toward airship 10, and the attachment member 90 is detached from the delivery cargo and the first hoist 88 is pulled back up to airship 10. The process may be repeated until all the cargo transfer is complete.

If a landed load exchange is to be conducted, the flight crew may work in conjunction with flight control system 24 to and airship 10 at destination site 300. For example, computer 200 may receive environmental condition data from a weather detection device, such as temperature, precipitation, wind speed, direction, and gust information, etc. Computer 200 may use this information to assist with a landing of airship 10. After airship 10 lands, a crew member may operate cargo handling system 22 to exchange delivery cargo (or ballast) with return cargo (or ballast) in a manner similar to that described above. Airship 10 may subsequently takeoff and travel to the next destination location.

Although, for purposes of this disclosure, certain disclosed features are shown in some figures but not in others, it is contemplated that, to the extent possible, the various features disclosed herein may be implemented by each of the disclosed, exemplary embodiments. Accordingly, differing features disclosed herein are not to be interpreted as being mutually exclusive to different embodiments unless explicitly specified herein or such mutual exclusivity is readily understood, by one of ordinary skill in the art, to be inherent in view of the nature of the given features.

While the presently disclosed device and method have been described with reference to the specific embodiments thereof, it should be understood by those skilled in the art that various changes may be made and equivalents may be substituted without departing from the scope of the disclosure. In addition, many modifications may be made to adapt a particular situation, material, composition of matter, process, process step, or steps to the objective, spirit, and scope of the present invention. Other embodiments of the invention will be apparent to those skilled in the art from consideration of the specification and practice of the invention disclosed herein. It is intended that the specification and examples be considered as exemplary only.

What is claimed is:

1. An airship comprising:
   a hull configured to contain a gas;
   a keel extending longitudinally along the airship and having a bottom surface configured to be a connection point for the cargo;
   at least one propulsion assembly coupled to the airship and including a propulsion device,
   a payload bay comprising an external cargo area located outside of the hull and external to the keel, the keel forming at least a portion of the external cargo area; and
   a cargo handling system comprising at least one hoisting mechanism fixed to the airship and configured to lift cargo from below the bottom surface of the keel into the external cargo area while the airship is hovering, wherein
   the keel includes a locking mechanism for securing the cargo externally to the keel at the bottom surface of the keel.

2. The airship of claim 1, wherein the locking mechanism is a twist lock.

3. The airship of claim 1, wherein the payload bay further comprises an internal cargo area housed within the keel.

4. The airship of claim 3, wherein:
   the keel comprises an opening separating the internal cargo area from the external cargo area, and
   the at least one hoisting mechanism is configured to lift the cargo into the internal cargo area through the opening.

5. The airship of claim 1, wherein the keel is approximately one third of an overall length of the airship.

6. The airship of claim 1, further comprising a gondola for transporting at least one crew member, the gondola forming at least a portion of the keel.

7. The airship of claim 6, wherein the gondola includes a control station configured to allow the at least one crew member to control the cargo handling system.

8. The airship of claim 7, wherein the gondola includes a window facing toward the external cargo area.

9. The airship of claim 1, further including a tunnel that runs longitudinally along the payload bay, the at least one hoisting mechanism configured to move longitudinally along the tunnel.

10. The airship of claim 1, wherein the hoisting mechanism includes at least one two-rail crane.

11. The airship of claim 1, wherein the airship further includes a landing gear assembly configured to contact the ground and maintain the hull above the ground.

12. The airship of claim 11, wherein the landing gear assembly includes a plurality of legs, each leg configured to be secured to a mooring pad on the ground.

13. The airship of claim 12, wherein each leg includes a winch configured to tighten a cable secured between the winch and the mooring pad.

\* \* \* \* \*